United States Patent
Shark et al.

(10) Patent No.: US 9,900,585 B2
(45) Date of Patent: Feb. 20, 2018

(54) DEVICE, SYSTEM AND METHOD FOR THREE-DIMENSIONAL MODELING

(71) Applicant: Matter and Form Inc., Toronto (CA)

(72) Inventors: Andrew Shark, Toronto (CA); Adam Brandejs, Toronto (CA); Trevor Townsend, Toronto (CA)

(73) Assignee: Matter and Form Inc., Toronto (CA)

( * ) Notice: Subject to any disclaimer, the term of this patent is extended or adjusted under 35 U.S.C. 154(b) by 0 days.

(21) Appl. No.: 14/915,030

(22) PCT Filed: Jan. 7, 2014

(86) PCT No.: PCT/CA2014/000007
§ 371 (c)(1),
(2) Date: Feb. 26, 2016

(87) PCT Pub. No.: WO2015/039210
PCT Pub. Date: Mar. 26, 2015

(65) Prior Publication Data
US 2016/0212412 A1   Jul. 21, 2016

Related U.S. Application Data

(60) Provisional application No. 61/879,650, filed on Sep. 18, 2013.

(51) Int. Cl.
*H04N 13/02* (2006.01)
*G01B 5/00* (2006.01)
(Continued)

(52) U.S. Cl.
CPC ....... *H04N 13/0282* (2013.01); *G01B 5/0004* (2013.01); *G01B 11/005* (2013.01);
(Continued)

(58) Field of Classification Search
None
See application file for complete search history.

(56) References Cited

U.S. PATENT DOCUMENTS 5,019,993 A * 5/1991 Montalcini ........ G05B 19/4207
700/187
5,028,799 A * 7/1991 Chen ...................... G01B 11/24
250/559.23
(Continued)

FOREIGN PATENT DOCUMENTS

KR   WO 2007102667 A1 *  9/2007  ........... A61B 5/0064
WO      WO 9415173 A1 *  7/1994  ............. G01B 11/25
(Continued)

OTHER PUBLICATIONS

International Search Report mailed on May 27, 2014 in connection with PCT/CA2014/000007 to Cox et al.

*Primary Examiner* — Ted Barnes
(74) *Attorney, Agent, or Firm* — Gilbert's LLP; Matthew D. Powell

(57) ABSTRACT

Various systems, methods and devices for capturing digital images of an object in a region of interest and for identifying points on the surface of an object in a region of interest are disclosed. A device operable to capture digital images of an object in a region of interest includes a support structure having an object support surface at the bottom of the region of interest; a scan head incorporating an imaging system comprising at least one digital imaging device located with respect to the support structure to have a field of view that includes a segment of the region of interest; and a first motive system operable to move the scan head along a fixed path between first and second vertical positions with respect to the support structure thereby to cause the at least one digital imaging device to have a field of view that includes (Continued)

a different segment of the region of interest. Various related systems, methods and devices are disclosed.

9 Claims, 22 Drawing Sheets

(51) Int. Cl.
    *G01B 11/25*     (2006.01)
    *G01B 11/00*     (2006.01)
    *G01B 11/24*     (2006.01)
    *G06K 9/32*     (2006.01)
    *G06K 9/46*     (2006.01)

(52) U.S. Cl.
    CPC .............. *G01B 11/24* (2013.01); *G01B 11/25* (2013.01); *G06K 9/3233* (2013.01); *G06K 9/4661* (2013.01); *H04N 13/0253* (2013.01); *H04N 13/0296* (2013.01)

(56) References Cited

U.S. PATENT DOCUMENTS

| | | | | |
|---|---|---|---|---|
| 5,686,992 | A * | 11/1997 | Kawamoto | B44C 1/222 356/601 |
| 5,850,290 | A * | 12/1998 | Horiguchi | A61B 5/0064 356/602 |
| 6,858,826 | B2 * | 2/2005 | Mueller | G01B 11/00 250/208.1 |
| 6,951,304 | B2 * | 10/2005 | Good | G02B 26/10 235/462.25 |
| 7,773,120 | B2 * | 8/2010 | Simon | G06K 9/228 348/136 |
| 9,310,317 | B2 * | 4/2016 | Georgeson | G01B 11/24 |
| 2003/0035061 | A1 * | 2/2003 | Iwaki | G06T 17/10 348/371 |
| 2003/0231793 | A1 * | 12/2003 | Crampton | G01B 11/2518 382/154 |
| 2004/0008875 | A1 * | 1/2004 | Linares | G06K 9/00013 382/124 |
| 2004/0150837 | A1 * | 8/2004 | Sugiyama | G01B 11/2518 356/603 |
| 2004/0223077 | A1 * | 11/2004 | Said | H04N 13/021 348/370 |
| 2005/0109847 | A1 * | 5/2005 | Good | A47F 9/04 235/462.4 |
| 2005/0109849 | A1 * | 5/2005 | Good | A47F 9/04 235/462.39 |
| 2005/0121422 | A1 * | 6/2005 | Morden | B25H 7/00 219/121.6 |
| 2005/0249388 | A1 * | 11/2005 | Linares | G06K 9/00013 382/124 |
| 2006/0045316 | A1 * | 3/2006 | Hauke | G06K 9/00033 382/116 |
| 2006/0154198 | A1 * | 7/2006 | Durbin | A61C 9/00 433/29 |
| 2006/0233427 | A1 * | 10/2006 | Hauke | G06K 9/00033 382/124 |
| 2007/0007350 | A1 * | 1/2007 | Good | G06K 7/10693 235/462.14 |
| 2007/0017995 | A1 * | 1/2007 | Good | G06K 7/10693 235/462.39 |
| 2007/0029389 | A1 * | 2/2007 | Good | G02B 26/129 235/462.14 |
| 2007/0285668 | A1 * | 12/2007 | Bertola | G05B 19/4099 356/462 |
| 2008/0235970 | A1 * | 10/2008 | Crampton | B25J 13/088 33/503 |
| 2009/0121023 | A1 * | 5/2009 | Good | G06K 7/10693 235/462.4 |
| 2010/0274525 | A1 * | 10/2010 | Zoeller, III | G01B 11/24 702/167 |
| 2012/0092461 | A1 * | 4/2012 | Fisker | A61B 5/0068 348/46 |
| 2012/0170053 | A1 * | 7/2012 | Krakenes | G01B 11/24 356/612 |
| 2013/0242314 | A1 * | 9/2013 | Fowler | G01S 17/42 356/601 |
| 2014/0036034 | A1 * | 2/2014 | Boyer | B29C 67/0051 348/46 |
| 2014/0036035 | A1 * | 2/2014 | Buser | B29C 67/0051 348/46 |
| 2014/0037194 | A1 * | 2/2014 | Kitamura | G01B 11/24 382/154 |
| 2014/0313518 | A1 * | 10/2014 | Fowler | G01S 17/42 356/601 |
| 2014/0314308 | A2 * | 10/2014 | Kitamura | G01B 11/24 382/154 |
| 2014/0336806 | A1 * | 11/2014 | Bewlay | G06F 17/50 700/98 |
| 2015/0042757 | A1 * | 2/2015 | Goodman | G01B 11/2504 348/46 |
| 2015/0054918 | A1 * | 2/2015 | Lee | H04N 13/0221 348/46 |
| 2016/0109562 | A1 * | 4/2016 | Fowler | G01S 17/42 356/5.01 |
| 2016/0185047 | A1 * | 6/2016 | Windau | B29C 67/0088 358/406 |
| 2016/0255341 | A1 * | 9/2016 | Mateti | G06T 5/006 348/187 |

FOREIGN PATENT DOCUMENTS

| | | | | |
|---|---|---|---|---|
| WO | WO2007/102667 | | 9/2007 | |
| WO | WO 2007102667 A1 | * | 9/2007 | ........... A61B 5/0064 |
| WO | WO2010/145669 | | 12/2010 | |

* cited by examiner

DEVICE, SYSTEM AND METHOD FOR THREE-DIMENSIONAL MODELING

FIELD OF THE INVENTION

The following relates generally to three-dimensional modeling, and more particularly to devices, systems and methods for capturing digital images of an object in a region of interest, and for identifying points on the surface of an object in a region of interest.

BACKGROUND OF THE INVENTION

Three-dimensional (3D) modeling is a term given to the process by which a digital model of a three-dimensional object, or of its surface, is developed. 3D modeling may be done entirely by manipulation of specialized Computer Aided Design (CAD) software to produce digital representations of an object's surface, or may be done with the aid of a 3D scanner.

A 3D scanner is a device that can be used to gather data about the surfaces of a real world object such that the data can be used to build a three-dimensional digital model of the object. 3D scanners are generally categorized as contact or non-contact, and may further be categorized as passive or active, depending upon the manner by which the data about the real-world object is gathered. For example, a contact scanner generally includes one or more probes that physically contact points on the surface of the object being scanned. The contact scanner converts data about the positions of the probe(s) when contacting the object into three-dimensional data for the model.

Various types of non-contact scanners, both active and passive, are known. Passive non-contact 3D scanners generally use one or more imaging devices to gather data about interactions between ambient light and the object to be scanned. Active non-contact 3D scanners generally emit radiation, and detect the interaction of the radiation with the object being scanned thereby to gather data for the three-dimensional model.

One such type of active non-contact 3D scanner is a triangulation-based 3D scanner, which directs one or more beams of radiation, such as a laser beam or laser stripe, into a region of interest in which the object being scanned is located. One or more imaging devices such as a digital camera having a field of view that includes the object each captures one or more two-dimensional images that may include a reflection off of the object being scanned of the one or more beams of radiation. A computer then processes the one or more images to determine any two-dimensional location(s) in the images to which the beam of radiation was reflected. Based on the identified two-dimensional location(s), the known position of the imaging device and the known path(s) of the beam(s) of radiation, the two-dimensional location(s) are converted by triangulation into points in a three-dimensional coordinate system.

The object is scanned in this way from a number of vantage points to create a three-dimensional model in the form of a set of three-dimensional points, known as a point cloud. The point cloud, which may be in the form of a computer file, may be employed for various uses, may be further processed to clean up the point cloud, and/or may be provided to a downstream system or process for converting the point cloud representation into, for example, a three-dimensional model in the form of a three-dimensional surface representation of the object, by conversion to a polygon or triangle mesh.

The correspondence between points in the point cloud and points on the real world object depends in part upon the configuration of the 3D scanner. For a triangulation-based 3D scanner, a higher resolution scan may be conducted the closer each imaging device is to the object being scanned because the points on the object from which the beam of radiation is reflecting are more individually discernable in the pixels of the two-dimensional images. However, as the imaging device and the object are arranged closer together to increase imaging resolution, the size of object that may be captured fully within the field of view of the imaging device becomes smaller.

Furthermore, generally the field of view of the imaging device will encompass background features in addition to the object being scanned, resulting in capturing images that include the background features. While the trajectory by which the beams of radiation enter and exit the region of interest can be established such that the beams of radiation will not be incident on background features within the field of view of the imaging device under normal circumstances, in the event that a foreign object crosses the field of view during image capture and reflects the beam of radiation towards the imaging device, the foreign object will cause registration of a point that is not in fact on the surface of the object being scanned. As a result, the resultant point cloud would include "noise". It has been proposed to use a physical screen behind the object, or enclose the entire region of interest in a housing in order to limit the occurrence of such background noise. However, such screens or housings can render the 3D scanner physically more complex, bulkier, unwieldy and unattractive.

Furthermore, various relationships between the trajectory of a beam of radiation and the angle of the surface being scanned with respect to the beam of radiation may result in spreading of the beam of radiation being reflected, particularly as the surface approaches being parallel to the beam of radiation. As a result, a given point on the object may manifest itself as a corresponding set of multiple points in the two-dimensional image. While the set of points may be resolved into a single point simply by selecting the brightest point in the set and discarding the others, such a selection is arbitrary and may not result in the most accurate representation in the 3D model of the point on the object.

SUMMARY OF THE INVENTION

In accordance with an aspect, there is provided a device operable to capture digital images of an object in a region of interest, the device comprising a support structure having an object support surface at the bottom of the region of interest; a scan head incorporating an imaging system comprising at least one digital imaging device located with respect to the support structure to have a field of view that includes a segment of the region of interest; and a first motive system operable to move the scan head along a fixed path between first and second vertical positions with respect to the support structure thereby to cause the at least one digital imaging device to have a field of view that includes a different segment of the region of interest.

Providing the imaging device with multiple fields of view by virtue of the scan head being moveable vertically along the fixed path effectively enables the region of interest to be larger so as to enable scanning of taller objects for a given imaging resolution.

In an embodiment, the device further includes an illumination system switchable between a first illumination state and a second illumination state and comprising at least one illumination source, each illumination source independently operable to direct a respective beam of radiation into the region of interest. In another embodiment, the device further comprises a second motive system operable to rotate the object support surface with respect to the support structure about an axis that is normal to the object support surface.

A system for identifying points on the surface of an object in a region of interest, according to an embodiment, includes the device and a computing system configured for causing the illumination system to switch between the first illumination state and the second illumination state; causing the imaging system to capture a series of digital images of the region of interest, the series comprising at least one digital image captured during the first illumination state between digital images captured during the second illumination state; determining whether the digital images captured during the second illumination state are substantially different; and in the event that the digital images captured during the second illumination state are substantially different, re-executing the causing and determining steps; and otherwise processing digital images in the series of digital images to identify points on the surface of the object.

The determination as to whether the digital images captured during the second illumination state are substantially different permits the system to determine whether background noise such as background or object motion has occurred during captured of the series of digital images, and in this event the system can re-capture the series of digital images.

In accordance with another aspect, there is provided a computer-implemented method of identifying points on the surface of an object in a region of interest, the method comprising: using a computing system, causing an illumination system to switch between a first illumination state and a second illumination state, the illumination system comprising at least one illumination source, each illumination source independently operable to direct a respective beam of radiation into the region of interest; using the computing system, causing an imaging system to capture a series of digital images of the region of interest, the series comprising at least one digital image captured during the first illumination state between digital images captured during the second illumination state; using the computing system, determining whether the digital images captured during the second illumination state are substantially different; using the computing system, in the event that the digital images captured during the second illumination state are substantially different, re-executing the causing and determining steps; and otherwise using the computing system, processing digital images in the series of digital images to identify points on the surface of the object.

In an embodiment, the illumination system is in the second illumination state only while all illumination sources are OFF, and is otherwise in the first illumination state.

In an embodiment, the illumination system is in the second illumination state only while all illumination sources are ON, and is otherwise in the first illumination state.

In an embodiment, the illumination system is in the second illumination state only while all of the illumination sources are in respective predetermined ON or OFF, and is otherwise in the first illumination state.

In an embodiment, processing digital images in the series of digital images to identify points on the surface of the object comprises: using the computing system, comparing, on a pixel-by-pixel basis, at least one of the digital images captured during the first illumination state to one of the digital images captured during the second illumination state to identify locations of pixels that are substantially different in intensity; and using the computing system, storing data indicating the identified locations.

In an embodiment, the illumination system comprises at least two illumination sources, the method further comprising: using the computing system, storing data indicative of the pixel location as attributable to one of the at least two illumination sources depending upon which of the illumination sources changed between ON and OFF and whether pixels are substantially different due to an increase or a decrease in intensity.

In an embodiment, processing digital images in the series of digital images to identify points on the surface of the object further comprises: using the computing system, comparing on a pixel-by-pixel basis at least one of the digital images captured during the first illumination state to another one of the digital images captured during the first illumination state, at least one illumination source being ON in one of the digital images being compared and OFF in the other, to identify locations of pixels that are substantially different in intensity; and using the computing system, storing data indicating of the identified locations.

In an embodiment, each beam of radiation is a laser stripe.

In an embodiment, the method further comprises: using the computing system, causing each illumination source to sweep its laser stripe through a range of angles during capturing of the series of digital images.

In an embodiment, the digital images captured during the second illumination state are substantially different in the event that the intensity of at least one pixel differs by a threshold amount.

In an embodiment, the digital images captured during the second illumination state are substantially different only in the event that the intensity of at least one pixel of a predetermined colour differs by the threshold amount.

In an embodiment, the predetermined colour is substantially the same as the colour of the at least one beam of radiation.

In an embodiment, the predetermined colour is one of red, green, and blue.

In an embodiment, the threshold amount is 30 bytes.

In an embodiment, the threshold amount is based on a level of intensity of the at least one illumination source beam of radiation.

In an embodiment, the threshold amount is about 30 bytes.

In an embodiment, the method further comprises: using the computing system, causing the object to rotate with respect to the imaging system thereby to provide the imaging system with a different vantage of the object within the region of interest for capturing additional series of digital images of the region of interest.

In an embodiment, the method further comprises: using the computing system, determining the degree to which the object is caused to rotate with respect to the imaging system based on a distance between the imaging system and the object as determined during the processing.

In an embodiment, the at least one illumination source is fixed in position with respect to the imaging system.

In an embodiment, the method further comprises: using the computing system, in the event that the object has been caused to rotate 360 degrees with respect to the imaging system, determining whether to translate the imaging system in a Y direction with respect to the object for determining additional contours of the object.

In an embodiment, determining whether to translate the imaging system with respect to the object comprises: using the computing system, determining the maximum Y-value of the object in the current field of view of the imaging system.

In accordance with another aspect, there is provided a non-transitory computer readable medium embodying a computer program executable on a computing system for identifying points on the surface of an object in a region of interest, the computer program comprising computer program code for causing an illumination system to switch between a first illumination state and a second illumination state, the illumination system comprising at least one illumination source individually switchable between the first and second illumination states to direct a respective beam of radiation into the region of interest; computer program code for causing an imaging system to capture a series of digital images of the region of interest, the series comprising at least one digital image captured during the first illumination state between digital images captured during the second illumination state; computer program code for determining whether the digital images captured during the second illumination state are substantially different; and computer program code for, in the event that the digital images captured during the second illumination state are substantially different, re-executing the causing and determining steps; and otherwise processing digital images in the series of digital images to identify points on the surface of the object.

In accordance with another aspect, there is provided a computing system comprising at least one processor executing instructions for identifying points on the surface of an object in a region of interest, the at least one processor configured for: causing an illumination system to switch between a first illumination state and a second illumination state, the illumination system comprising at least one illumination source individually switchable between the first and second illumination states to direct a respective beam of radiation into the region of interest; causing an imaging system to capture a series of digital images of the region of interest, the series comprising at least one digital image captured during the first illumination state between digital images captured during the second illumination state; determining whether the digital images captured during the second illumination state are substantially different; in the event that the digital images captured during the second illumination state are substantially different, re-executing the causing and determining steps; and otherwise: processing digital images in the series of digital images to identify points on the surface of the object.

In accordance with another aspect, there is provided a system for capturing digital images of an object in a region of interest, the system comprising: a support structure having an object support surface at the bottom of the region of interest; a scan head incorporating an imaging system comprising at least one imaging device positioned with respect to the support structure to have a field of view that includes a segment of the region of interest; and a computing system configured to cause the imaging system to capture a series of digital images, the computing system further configured to select two of the images at respective predetermined positions in the series, to automatically process the selected two digital images to determine whether they are substantially different and, in the event that the selected two images are substantially different, to automatically cause the image capture device to capture a replacement series of digital images.

In accordance with another aspect, there is provided a system for capturing digital images of an object in a region of interest, the system comprising: a support structure having an object support surface at the bottom of the region of interest, the object support surface being rotatable with respect to the support structure about an axis that is normal to the object support surface; a scan head incorporating an imaging system comprising at least one imaging device positioned with respect to the support structure to have a field of view that includes a segment of the region of interest; and a computing system configured to cause the imaging system to capture a series of digital images, the computing system further configured to process digital images in the series of digital images to identify points on the surface of the object in the region of interest, and to cause the rotatable support surface to rotate an amount that is based on the location of the identified points.

In accordance with another aspect, there is provided a computer-implemented method of selecting an object point from a set of candidate object points in a row of pixels in a digital image, the method comprising: using a computing system, identifying the highest intensity pixel in the row; using the computing system, comparing intensities of neighbouring pixels at a predetermined number of progressively outward positions in the row on either side of the highest intensity pixel and adding to a candidate pixel list those pixels that, during each comparison, have the highest intensities; and using the computing system, designating the object point as the pixel that, in the range of pixels in the pixel list, is at the midway position.

In an embodiment, the predetermined number is five (5).

Other aspects and advantages will be apparent from the following description and from the drawings.

BRIEF DESCRIPTION OF THE DRAWINGS

Embodiments of the invention will now be described with reference to the appended drawings in which.

DETAILED DESCRIPTION

Figure 1:
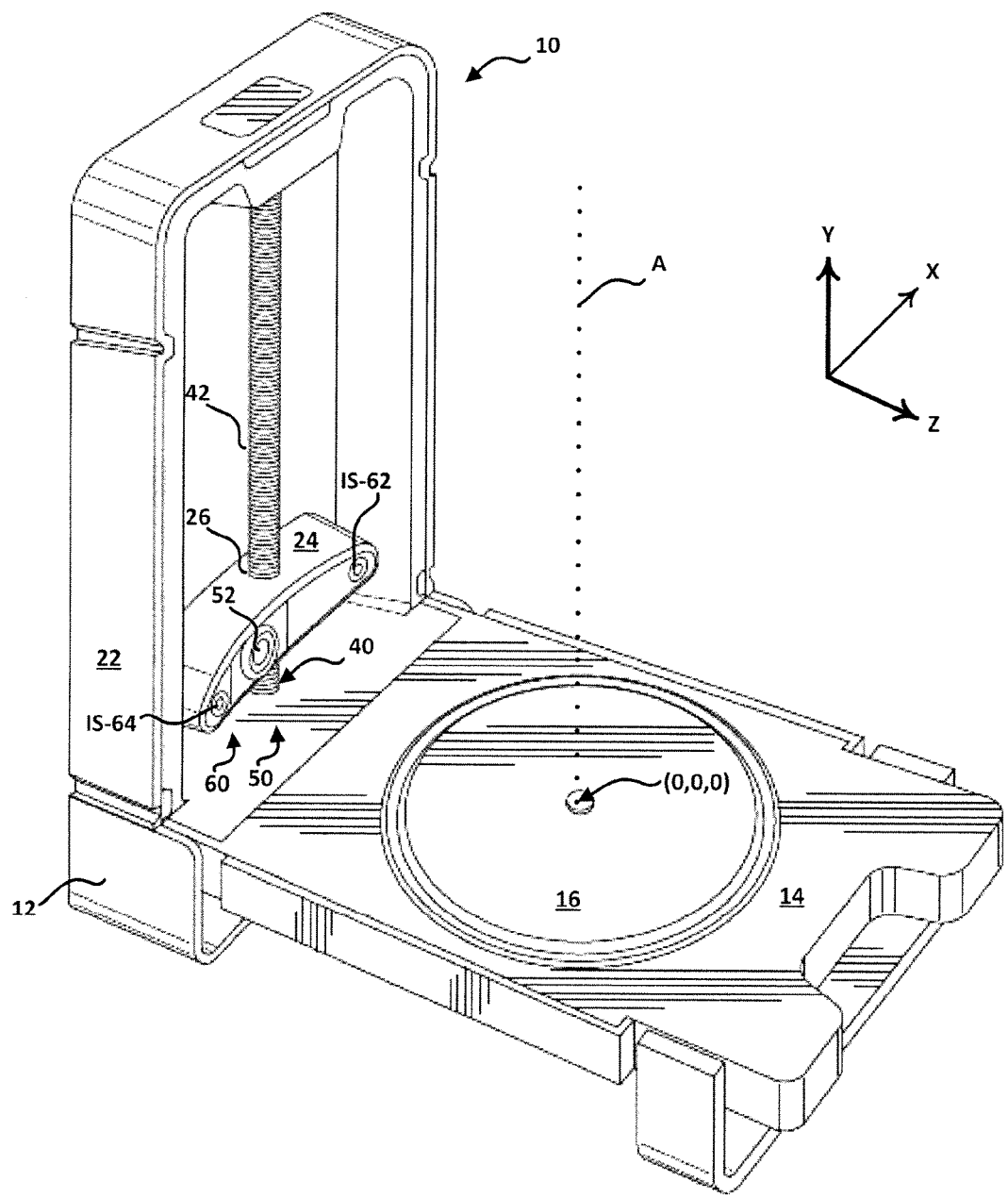
FIG. 1 is a perspective view of a device operable to capture digital images of an object in a region of interest for 3D scanning, according to an embodiment.
Figure 2:
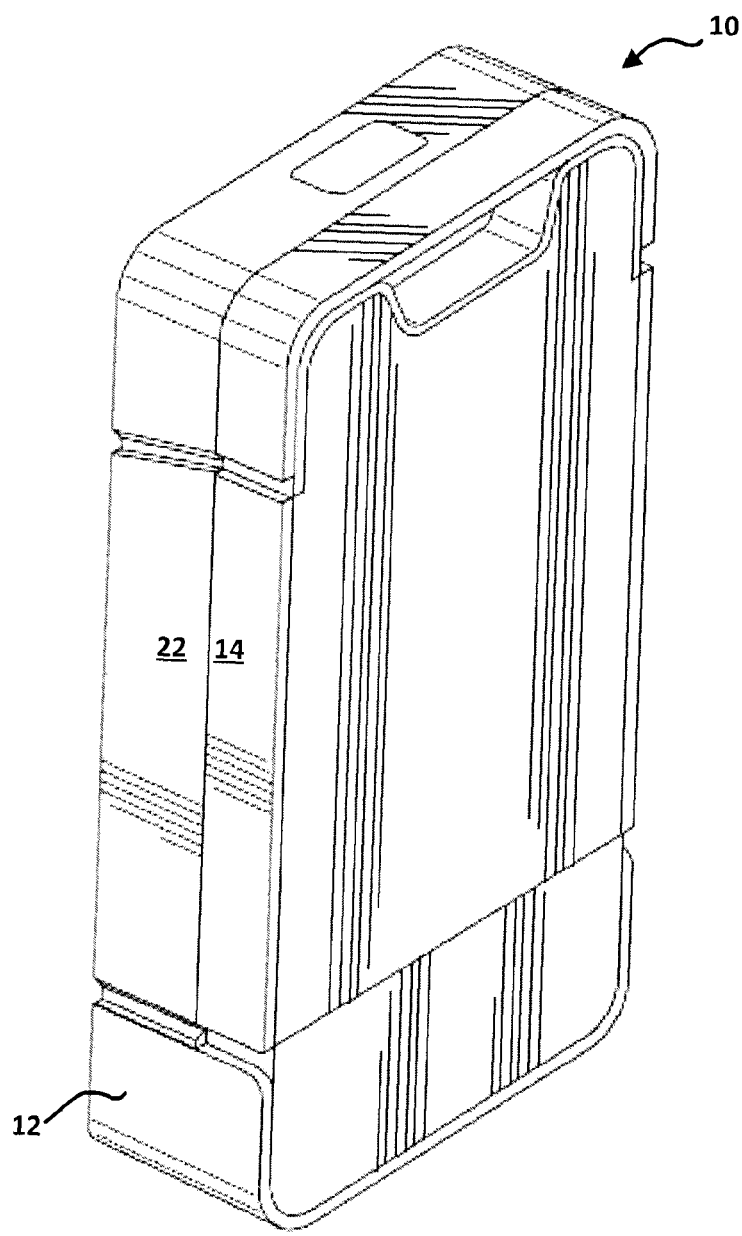
FIG. 2 is a perspective view of the device of FIG. 1 in a closed position.

FIG. 1 is a perspective view of a device 10 operable to capture digital images of an object in a region of interest for 3D scanning, according to an embodiment. Device 10 includes a housing 12 with an object support component 14 and a scanner support component 22. In this embodiment, object support component 14 and scanner support component 22 are pivotally connected at respective ends to one another. For 3D scanning, object support component 14 and scanner support component 22 are positioned by a user such that object support component 14 is generally horizontally positioned (on a table or desk, for example) and scanner support component 22 extends vertically upwards from an end of object support component 14. When not in use, object support component 14 and scanner support component 22 may be pivoted so as to be folded together and closed, such that housing 12 is more compact, as shown in FIG. 2.

As can be seen in FIG. 1, object support component 14 incorporates an object support surface 16. In this embodiment, object support surface 16 is a circle-shaped turntable that is rotatable with respect to the object support component 14 about an axis A extending from the centre of the circle and normal to the generally planar surface of object support surface 16, by operation of a turntable motive system 18.

Figure 3:
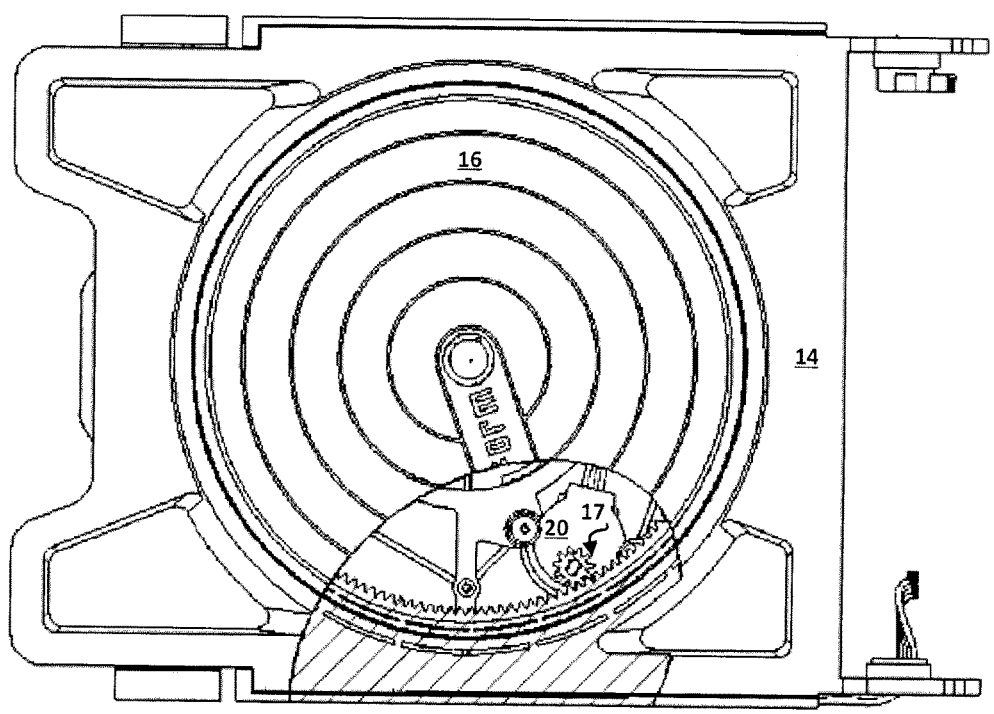
FIG. 3 is a partial cutaway top view of portions of the device of FIG. 1 showing portions of a turntable motive system.

FIG. 3 is a partial cutaway top view of portions of the device of FIG. 1 showing portions of the turntable motive system 18. Turntable motive system 18 includes a unipolar motor 20 that is coupled to the object support surface 16 via gearing system 17 and operable as will be described to rotate the object support surface 16 about axis A.

Scanner support component 22 of device 10 incorporates a scanner head 24 and a scanner motive system 40. Scanner head 24 and scanner motive system 40 cooperate to enable scanner motive system 40 to be operated to move scanner head 24 to different vertical positions along a fixed path with respect to object support component 14.

In this embodiment, scanner motive system 40 includes a threaded rail 42 that is rotatably supported within the scanner support component 22 and that is rotatable by a motor 44 positioned in the lower end of the scanner support component 22 to cooperate with the lower end of the threaded rail 42. Motor 44 is a bipolar motor having its own control microprocessor to receive and process simplified commands from the central processor 81 without tying up cycles on the central processor 81.

Threaded rail 42 defines the fixed path along which the scanner head 24 may be moved, and is threaded into a cooperating threaded shaft 26 that runs through the scanner head 24. During use, if threaded rail 42 is caused to rotate by operation of motor 44, threaded rail 42 cooperates with threaded shaft 26 of the scanner head 24 to cause the scanner head 24, which is unable to rotate along with the threaded rail 42, to be moved vertically either upwards or downwards with respect to the object support component 14. It will be understood that the motor 44 cooperating with the threaded rail 42 may be operated to rotate either clockwise or counter clockwise in order to cause the scanner head 24 to move upwards or downwards.

Figure 4:
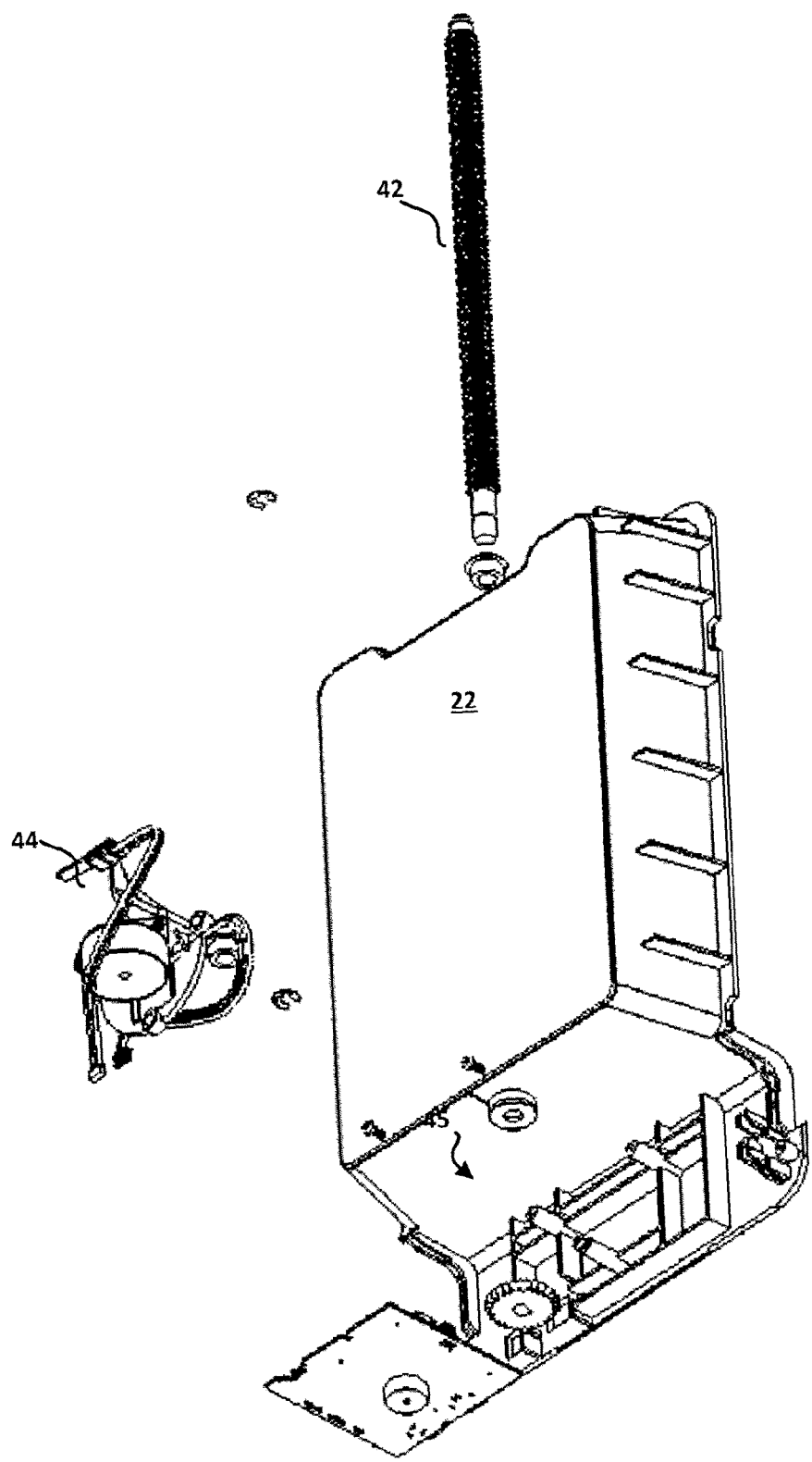
FIG. 4 is an exploded rear perspective view of portions of the device of FIG. 1 showing portions of a scanner motive system.

FIG. 4 is an exploded rear perspective view of portions of the device of FIG. 1 showing portions of the scanner motive system 40 including motor 44 for coupling to threaded rail 42 via gearing system 45.

Scanner head 24 also incorporates an imaging system 50 and an illumination system 60. Imaging system 50 includes a digital imaging device which is, in this embodiment, an HD CMOS (High Definition, Complementary Metal Oxide Semiconductor) digital camera 52. Digital camera 52 faces outwards from the scanner head 24 towards the region of interest such that, at any given vertical position of the scanner head 24 along the fixed path, the field of view of digital camera 52 includes a segment of the region of interest. With the scanner head 24 cooperating with the scanner motive system 40, the digital camera 52 may be caused to move to different vertical positions thereby to have a field of view that includes corresponding different segments of the region of interest. By enabling scanner head 24 to move with respect to the object support component 14, an object that is taller than the height of the field of view of the digital camera 52 may be scanned without having to sacrifice imaging resolution. As such, the region of interest at a given imaging resolution can be larger than if the same digital camera 52 could not be moved.

In this embodiment, illumination system 60 includes two illumination sources IS-62 and IS-64, each of which is a laser individually operable to direct a respective 605 nanometer (nm) red vertical laser stripe into the region of interest and towards the axis A. In particular, each of IS-62 and IS-64 is individually operable to be turned ON and OFF. As will be described, illumination system 60 is either in a first illumination state or a second illumination state depending upon the ON/OFF state of IS-62 and IS-64, as will be described below.

Figure 5:
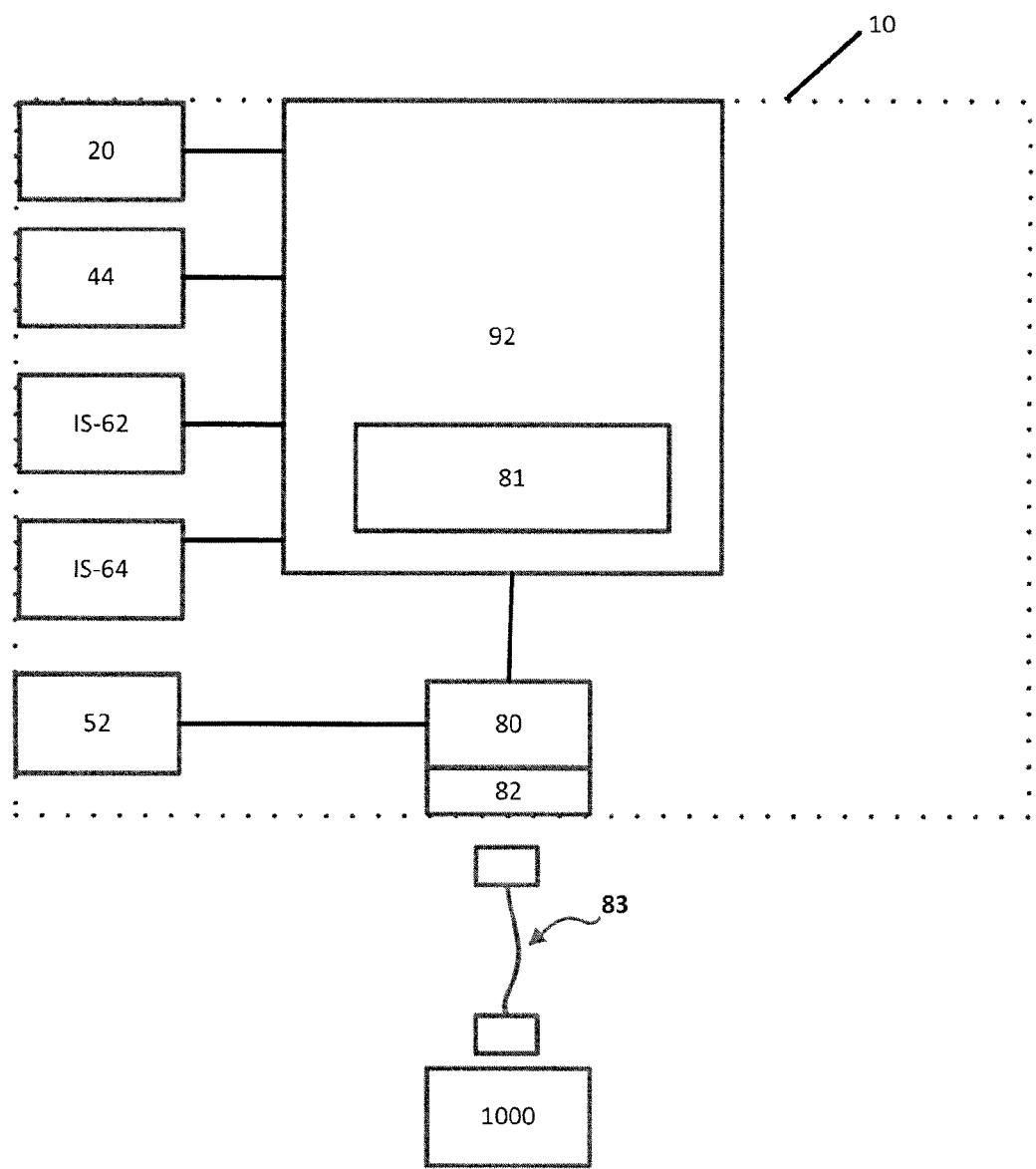
FIG. 5 is a schematic block diagram of a system including the device of FIG. 1 in further detail, and a controller, according to an embodiment.

FIG. 5 is a schematic block diagram of a system including the device 10 in further detail, and a controller 1000, according to an embodiment. Device 10 is powered by a 12-Volt (V), 2 Ampere (A) external power supply (not shown), which provides power to a main board 92, which in turn converts the power to each of 5V and 3.3V for the logic circuitry, and provides the power to various components. Each of motor 20, motor 44, and illumination sources IS-62 and IS-64 is operably connected to the main board 92 to receive power and to communicate with a central processor 81. In this embodiment, central processor 81 is a microcontroller manufactured by Atmel Corporation of San Jose, Calif., U.S.A.

Central processor 81 is connected to one port of a two-port USB hub 80, which is in turn connected to USB interface 82. The other port of the two-port USB hub 80 is connected to digital camera 52. USB interface 82 can receive an external USB cable 83 for enabling data communications with controller 1000 via one of its own USB ports in its communications interface 1020 such that the components of device 10 may be operated by controller 1000 as will be described. Controller 1000 may communicate with digital camera 52 without communicating with central processor 81 and vice versa, in this embodiment.

In this embodiment, the central processor 81 receives gcode (G programming language) commands sent from controller 1000 and interprets the geode commands as them into motions that the scanner should perform. It controls the lasers, speaker, hall effect sensor and both motors.

While the various components receive their operational power from power bus 91, in alternative embodiments, a device may be configured such that one or more components may receive operational power solely from the USB bus 80. It will also be understood that additional components, such as a status light, a scan initiation button, an audible indicator, though not shown in the drawings, may also be connected to USB bus line 80 and/or power bus line 91.

Figure 6:
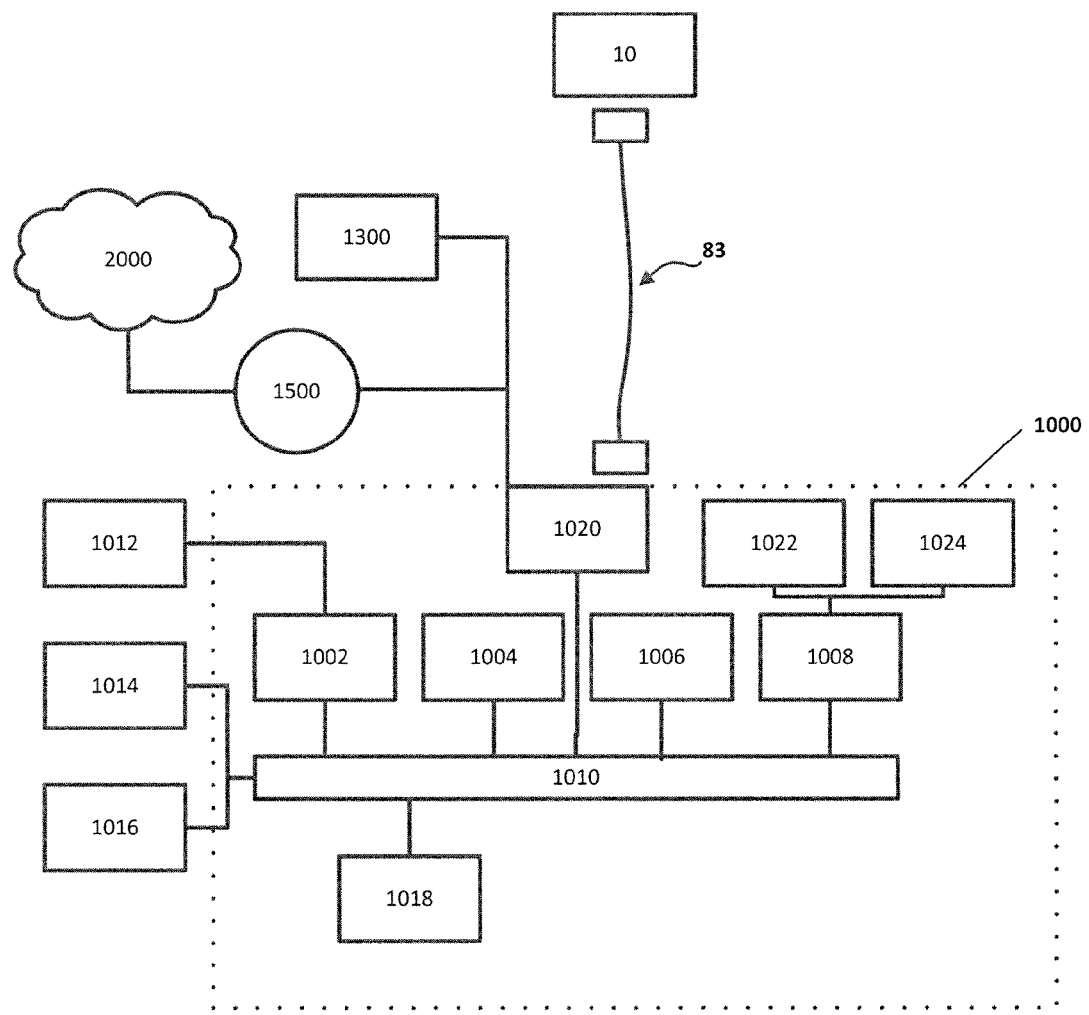
FIG. 6 is a schematic block diagram of a system including the device of FIG. 1 and the controller in further detail, according to an embodiment.

FIG. 6 is a schematic block diagram of the system including the device of FIG. 1 and the controller 1000 in further detail. In this embodiment, controller 1000 is a computing system that is incorporated into a laptop or desktop computer or other similar device.

Controller 1000 includes a bus 1010 or other communication mechanism for communicating information, and a processor 1018 coupled with the bus 1010 for processing the information. Controller 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The controller 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The controller 1000 also includes a disk controller 1008 coupled to the bus 1010 to control one or more storage devices for storing information and instructions, such as a magnetic hard disk 1022, and a removable media drive 1024 (e.g., floppy disk drive, read-only compact disc drive, read/write compact disc drive, compact disc jukebox, tape drive, and removable magneto-optical drive). The storage devices may be added to the controller 1000 using an appropriate device interface (e.g., small computing system interface (SCSI), integrated device electronics (IDE), enhanced-IDE (E-IDE), direct memory access (DMA), or ultra-DMA).

The controller 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The controller 1000 may also include a display controller 1002 coupled to the bus 1010 to control a display 1012, such as a liquid crystal display (LCD) screen, for displaying information to a user of the controller 1000. The controller 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. In addition, a printer may provide printed listings of data stored and/or generated by the controller 1000.

In this embodiment, the controller 1000 performs a portion or all of the processing steps of the invention in response to the processor 1018 executing one or more sequences of one or more instructions contained in a memory, such as the main memory 1004. Such instructions may be read into the main memory 1004 from another computer readable medium, such as a hard disk 1022 or a removable media drive 1024. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the controller 1000 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the controller 1000, for driving a device or devices for implementing the invention, and for enabling the controller 1000 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A computer readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications.

Various forms of computer readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the controller 1000 may receive the data on the telephone line and use an infrared transmitter to convert the data to an infrared signal. An infrared detector coupled to the bus 1010 can receive the data carried in the infrared signal and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

The controller 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet, or to another device via, for example, a USB connection such as device 10. The communication interface 1020 may include a network interface card to attach to any packet switched LAN. As another example, the communication interface 1020 may include an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information and, in the case of USB, electrical power.

The network link typically provides data communication through one or more networks to other data devices. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface 1020, which carry the digital data to and from the controller 1000 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

The region of interest is a three-dimensional volume in which an object to be scanned may be placed. It will be understood that the size and configuration of the region of interest depends on relative positioning and capabilities of the various components of which the device 10 is comprised. For example, the height of the region of interest is defined by both the height of the field of view of the digital camera 52 and the length of the fixed path along which the scanner head 24 incorporating the digital camera 52 can be moved. Similarly, the breadth of the region of interest is defined by the distance from the digital camera 52 to the axis A and the breadth of the field of view of the digital camera 52. The closer the field of view of the digital camera 52 approaches 180 degrees from less than that amount, the less the breadth of the field of view will factor in the trade-off between object size that can be scanned and imaging resolution.

In this embodiment, device 10 is configured and arranged to have a region of interest of a suitable volume that enables scanning of an object that is up to 25 centimeters (9.8 inches) in height and up to 18 centimeters (7.0 inches) in diameter, with a position and resolution of the digital camera 52 permitting details on the object being scanned as small as 0.43 mm to be discerned. However, other embodiments of device 10 may alternatively be configured and arranged to provide a region of interest that enables scanning of an object that is taller and/or larger in diameter, or to provide a region of interest that enables scanning of only objects that are shorter and/or not as wide, with similar or different imaging resolutions.

The digital camera 52 has a field of view that may include an object that has been placed upon the rotatable object support surface 16, and may also include background objects or features that lie behind or otherwise beyond the boundaries of the object but captured within the field of view.

Illumination sources IS-62 and IS-64 are operated by the controller 1000 to be turned ON and OFF, respectively, in synchronization with operation by the controller 1000 of image capture by the digital camera 52, as will be described.

In general, as will be described in further detail below, controller 1000 causes each illumination source IS-62 and IS-64 to direct a respective red vertical laser stripe from its respective vantage point into the region of interest, and particularly towards the axis A. In the event that there is an object in the region of interest that is within the field of view of the digital camera 52 and that also lies on the path of a given laser stripe, the laser stripe will be incident on a portion of the object. The laser stripe brightens the points on the object on which it is incident. The digital camera 52 capturing an image while the laser stripe is brightening the points on the object on which it is incident will capture those brightened points that are not occluded by other parts of the object as a bright line of pixels or a single pixel or, in the event that object surfaces cause light scattering, as a set of bright points and/or bright line segments. Due to the trajectory of each laser stripe into the region of interest and the positioning and field of view of the digital camera 52, the laser stripe will not generally be incident on any background objects within the field of view of the digital camera 52 where there is no interference due to background motion, even if there is no object within the region of interest to be scanned. As such, the digital camera 52 will only capture bright points and line segments that actually reflect off of the object when in the region of interest. The bright points identified in the captured digital image(s) are recorded and converted by the controller 1000 using triangulation into corresponding points in a 3D coordinate system. In order to triangulate, the controller 1000 is calibrated with the positions of illumination sources IS-62 and IS-64, the position of the digital camera 52, and the position of axis A.

It will be understood that a given object may be too large to fully fit within the region of interest. For example, a portion of the object that is in the region of interest may extend beyond the field of view of the imaging system. Furthermore, the object may be taller than the region of interest and/or may be wider than the region of interest. As such, the portions of the object that extend beyond the region of interest will not be scanned while they are outside the region of interest.

Figure 7:
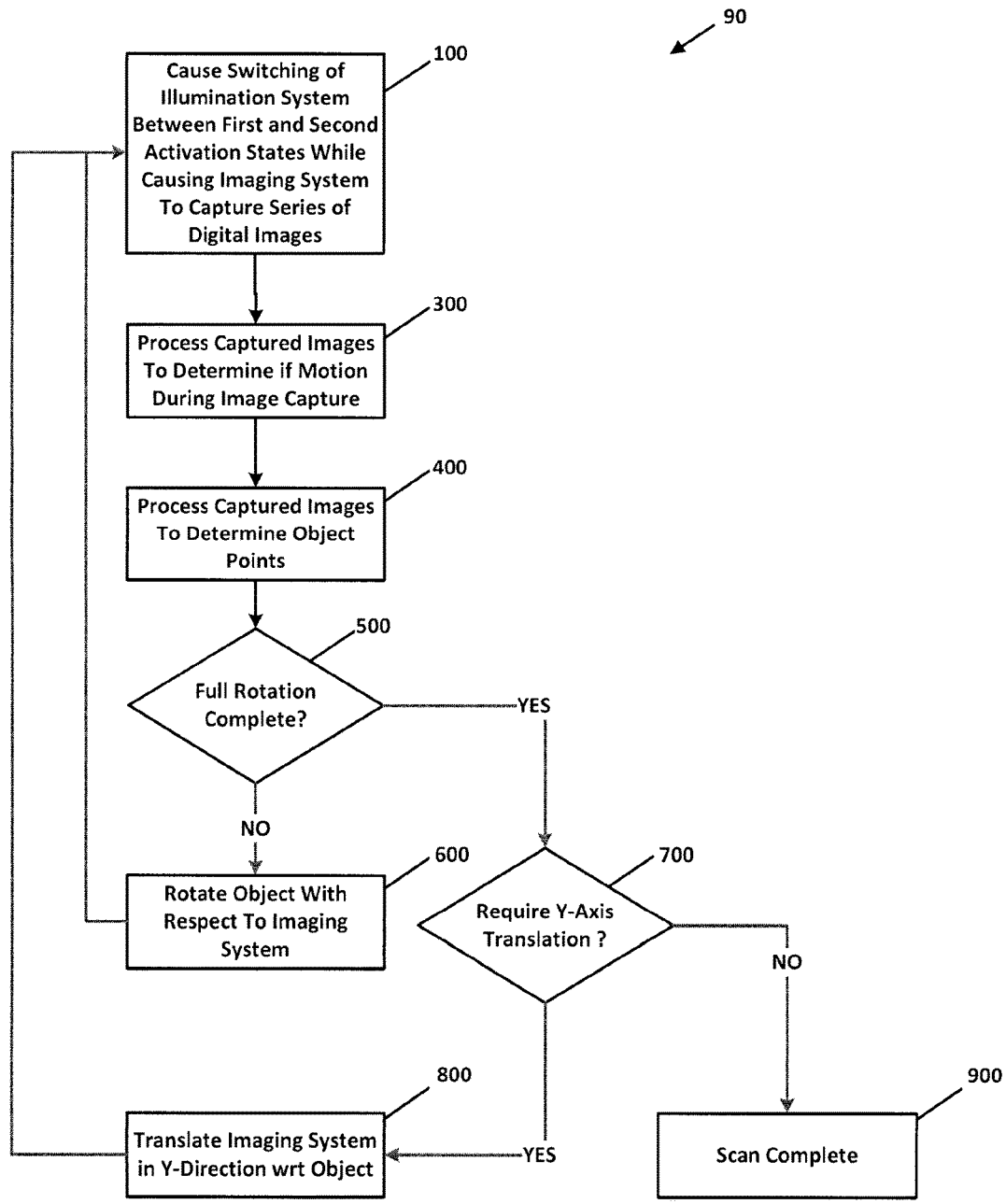
FIG. 7 is a flowchart depicting the general steps for identifying points on an object in a region of interest, according to an embodiment.

FIG. 7 is a flowchart depicting steps in a computer-implemented method 90 of determining points on an object in a region of interest, according to an embodiment. During the method, an illumination system is caused to switch between a first illumination state and a second illumination state while an imaging system is caused to captured a series of digital images of the region of interest into which the object to be scanned has been placed (step 100). The switching does not occur during actual exposures, but rather before/after such exposures such that the series comprises at least one digital image captured during the first illumination state between digital images captured during the second illumination state. The captured digital images are processed to determine if motion occurred during capture of the series of digital images (step 300) and, in the event that it is determined that no motion occurred during capture of the series of digital images, the captured images are then processed to identify points on the surface of the object (step 400) thereby to build up a 3D point cloud model of the object.

With the captured images having been processed to identify the 3D points, it is then determined whether the object in the region of interest has been rotated a full turn (i.e., 360 degrees) with respect to the imaging system (step 500). In the event that the object in the region of interest has not been rotated a full turn with respect to the imaging system, the object is caused to rotate an amount with respect to the imaging system so that the imaging system has a vantage of (i.e., can "see" within its field of view) a new aspect of the object in the region of interest.

For ease of understanding, in this description the term digital image may be used interchangeably to refer to the digital image captured from the image capture device, as well as a data structure representation that may be stored and that contains numbers representing pixels of the captured digital image.

In an embodiment, the object is caused to rotate with respect to the imaging system 50 by controller 1000 causing object support surface 16 on which object is being supported to rotate about axis A by a threshold amount. In this manner, imaging system 50 and illumination system 60 are provided with a different vantage of the object, such that the illumination sources IS-62 and IS-64 are incident on a portion of the object that is adjacent to the portion of the object on which IS-62 and IS-64 were incident prior to the rotation, and such that imaging system 50 can capture additional aspects of the object within its field of view. It will be understood that, depending upon the surface(s) of the object being scanned, a laser stripe (or portion thereof) may be incident on a portion of the object that, from the point of view of imaging system 50, is occluded by another portion of the object. As such, even if a laser stripe brightens the portion of the object on which it is incident, if the imaging system 50 cannot see it, it will not be recorded as a 3D point on the object.

In an embodiment, the amount of rotation of object support surface 16 during step 600 is not fixed, but instead depends upon the determined location of the 3D points at the current position of object support surface 16. In particular, the amount of rotation depends upon how close the object being scanned is to the digital camera 52 (its Z-position). In general, if the closest 3D point scanned at a given position of the object support surface 16 determined by controller 1000 to be very far away from the digital camera 52, then the controller 1000 causes the amount of rotation to be smaller than if the closest 3D point were very close to the digital camera 52. In this way, for distant object surfaces, the rotation is more granular so as to capture more detail from the far away points thereby to attempt to provide more detail about the farther surface. For closer object surfaces, the rotation is less granular because sufficient numbers of points can be collected at the closer range for discerning a continuous, accurate surface. Causing rotation amounts to be larger when the object is determined to be closer to the digital camera 52 than when the object is determined to be farther from the digital camera 52 speeds up scanning for closer surfaces and reduces the collection of redundant points.

In an alternative embodiment, the amount of rotation is fixed and therefore not dependent upon how close the object is to the imaging system.

With the rotation amount having been determined and the rotation of the object with respect to the imaging system having been conducted, the method 90 then repeats starting to step 100 to determine additional 3D points as described above but from the new vantage.

However, in the event that it is determined at step 500 that the object in the region of interest has been rotated a full turn with respect to the imaging system, it is then determined whether a Y-axis translation of the imaging system with respect to the object in the region of interest is required (step 700). In the event that a Y-axis translation of the imaging system with respect to the object in the region of interest is required, then the imaging system is translated with respect to the object support component 14 and accordingly the object along the Y-axis (step 800) so that the imaging system has a field of view that includes a different segment of the region of interest, and thus of the object within the region of interest.

In an embodiment, controller 1000 determines whether to cause the scanner head 24 to be moved along the fixed Y-axis path such that the digital camera 52 has a field of view that includes a different segment of the region of interest (and thus a different segment of the object) and also so that the illumination sources IS-62 and IS-64 can direct respective red laser stripes into the different segment of the region of interest. In this embodiment, at the start of scanning, the scanner head 24 begins at the bottom such that the bottom of the field of view of digital camera 52 corresponds to the object support surface 16, and works its way upwards if required. Determining whether Y-axis translation is required is done by controller 1000 by determining whether the highest Y-position point or points (that is, the point or points that are farthest along the Y-axis from the object support component 14) identified to this point is at or very near to the top of the field of view of digital camera 52. If such a point is at or very near to the top of the field of view of digital camera 52, then it is inferred that the object is taller than the field of view of the digital camera 52. As such, the controller 1000 causes scanner motive system 40 to move scanner head 24 upwards along the threaded rail 42. Controller 1000 causes scanner motive system 40 to move scanner head 24 upwards an amount that enables the new field of view of the digital camera 52 at the higher position to overlap the previous field of view. In this embodiment, the amount the scanner head 24 is moved upwards is 37 millimeters (approx. 1.5 inches), and the field of view is greater than this amount.

In an alternative embodiment having illumination sources IS-62 and IS-64 that are not incorporated in the scanner head 24, the illumination sources IS-62 and IS-64 could be moved independently of the digital camera 52. Alternatively, illumination sources IS-62 and IS-64 could be maintained in a fixed position with respect to the object support surface 16 provided that they are positioned and arranged to direct their respective red vertical laser stripes into the region of interest such that the red vertical laser stripes are at least as tall as the region of interest throughout the entire region of interest.

With the imaging system having been translated vertically with respect to the object support component 14, the method 90 then repeats starting at step 100 to identify additional points on the object from the new vantage. Overlap of the vantages such that the field of view of the imaging system captures the same portion of the object from both vantages permits downstream processing with enough data to provide continuity in the object surfaces.

However, in the event that it is determined at step 700 that a Y-axis translation of the imaging system with respect to the object in the region interest is not required, the scan is considered complete 900.

In this embodiment, the illumination system 60 having only two illumination sources IS-62 and IS-64 is in its second illumination state only when both of the IS-62 and IS-64 are OFF (OFF-OFF) and is otherwise in the first illumination state. For greater clarity, the illumination system 60 is in the first illumination state when IS-62 and IS-64 are OFF and ON respectively, and is in the first illumination state also when IS-62 and IS-64 are ON and OFF, respectively.

More generally, in the second illumination state the illumination system 60 is producing a known and consistent illumination condition that is different from the illumination condition produced by the illumination system 60 in its first illumination state. In this way, any substantial differences between digital images captured during the second illumination state should signal that interfering movement of the object in the region of interest, or of some background feature, has occurred between the capture of those digital images, or that some other external change such as a change in the ambient lighting has occurred between the capture of those digital images the could add noise and thereby adversely affect downstream processing. A signal that motion has occurred is used to cause recapture of the series of digital images under the same illumination conditions imposed by the illumination system 60, so that a series of digital images captured without such movement can be further processed for points on the object. Otherwise, if a series of digital images is processed for points, but was captured during motion of either the object or some background feature or a change in ambient lighting (or some other interfering occurrence), then downstream processing may not be able to, for the purpose of identifying points on the object in the region of interest, distinguish between background motion or other interference and points actually on the object.

Figure 8:
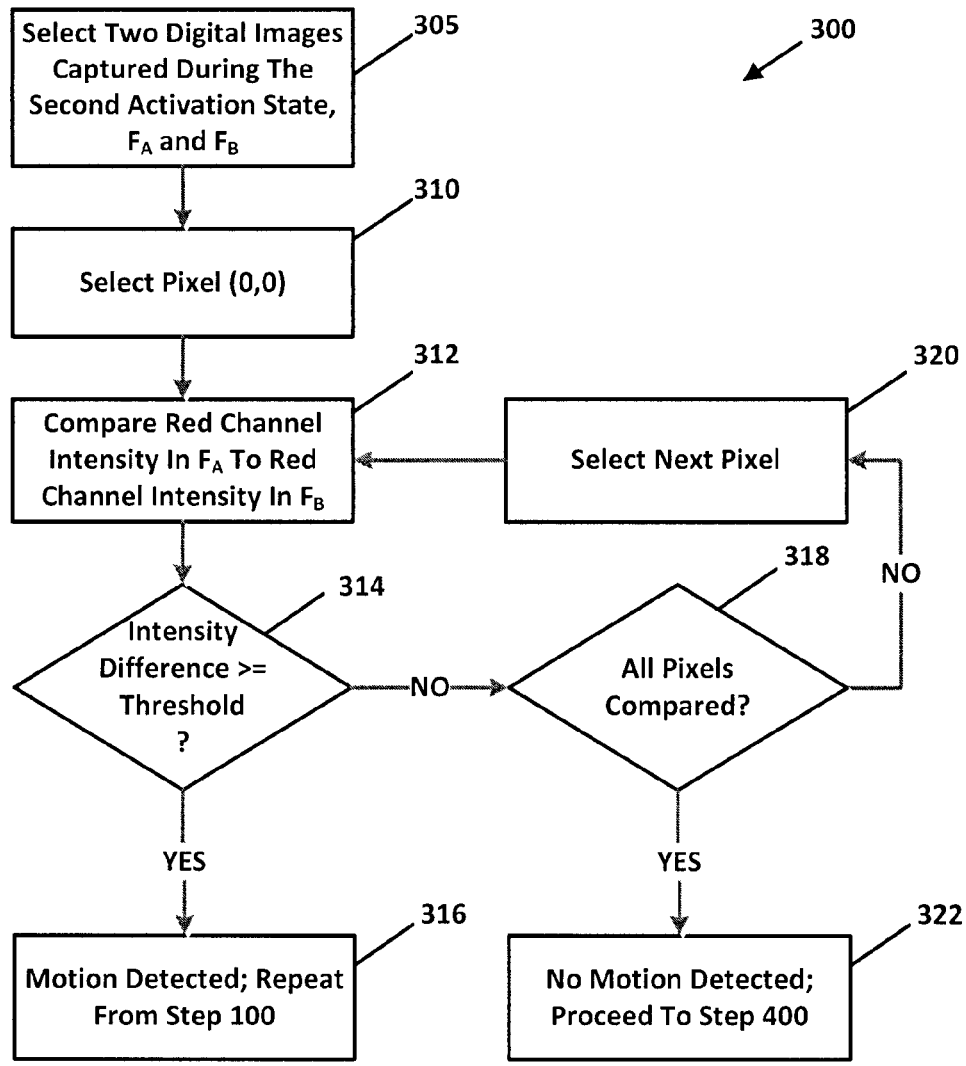
FIG. 8 is a flowchart depicting in further detail steps for processing captured digital images to determine if interfering motion has occurred during capture of the digital images, according to an embodiment.

FIG. 8 is a flowchart depicting in further detail steps for processing captured digital images to determine if interfering motion has occurred during capture of the digital images (step 300), according to an embodiment. Two digital images in the series that were captured during the second illumination state are selected (step 305). For the purpose of this description, these selected digital images are designated $F_A$ and $F_B$. A first pixel location, in this embodiment pixel location (0,0), is selected (step 310), and the intensity of the red channel at location (0,0) in $F_A$ is compared to the intensity of the red pixel at location (0,0) in $F_B$ (step 312). In the event that the intensity difference is greater than or equal to a minimum threshold amount (step 314), which in this embodiment is 20 bytes, then interference due to motion or some other interfering condition is considered to have been detected. This is because, in the absence of such interference, due to the illumination system imposing the same illumination conditions on the region of interest during capture of $F_A$ and $F_B$, the red channel intensity at (0,0) in $F_A$ should be the same or very close to the red channel intensity at (0,0) in $F_B$. Because such interference has been detected, interference detection processing can be stopped and the method 90 repeated from step 100 thereby to capture a new series of digital images while, it is hoped, no motion or other such interference is occurring. Repeating may occur more than once.

In this embodiment, the default minimum threshold is established automatically for the scan period to 30 bytes. However, this parameter may be changed by a user for a given implementation. It will be understood that the minimum threshold amount can be dependent upon a number of factors, such as laser intensity, colour of object, reflectivity of object, ambient lighting, a sensitivity parameter(s), and so forth.

However, if at step 314 it is determined that the intensity difference between the red channel at location (0,0) in $F_A$ and the red channel at location (0,0) in $F_B$ is not greater than or equal to (i.e., is less than) the threshold amount, then the pixels at location (0,0) provide no indication of motion. Whichever pixel is selected, it is then determined whether all pixels have been compared in the manner described above (step 318). In the event that not all pixels in $F_A$ and $F_B$ have been compared in the manner described above, the next pixel is selected (step 320), and the process continues from step 312 with the red channel of the newly selected pixel. This process will continue through all pixels in the digital images $F_A$ and $F_B$. However, if it is determined at step 318 that all pixels have been compared, then no motion or other interfering action has been detected and the process 90 may continue from step 400 (step 322).

The processes by which such interference is detected and, in turn, by which points on the surface of object are determined depends upon the nature of the series of digital images captured by the imaging system, which as described depends on the number of illumination sources in the illumination system 60 and the selected format of the first and second illumination states of the illumination system 60. In this embodiment, a four-image series of digital images F1-F4 for an illumination system having two illumination sources IS-62 and IS-64, where the second illumination state of the illumination system occurs only when both illumination sources IS-62 and IS-64 are OFF, is shown in Table 1 below:

TABLE 1

|       | F1  | F2  | F3  | F4  |
|-------|-----|-----|-----|-----|
| IS-62 | OFF | ON  | OFF | OFF |
| IS-64 | OFF | OFF | ON  | OFF |

Figure 8A:
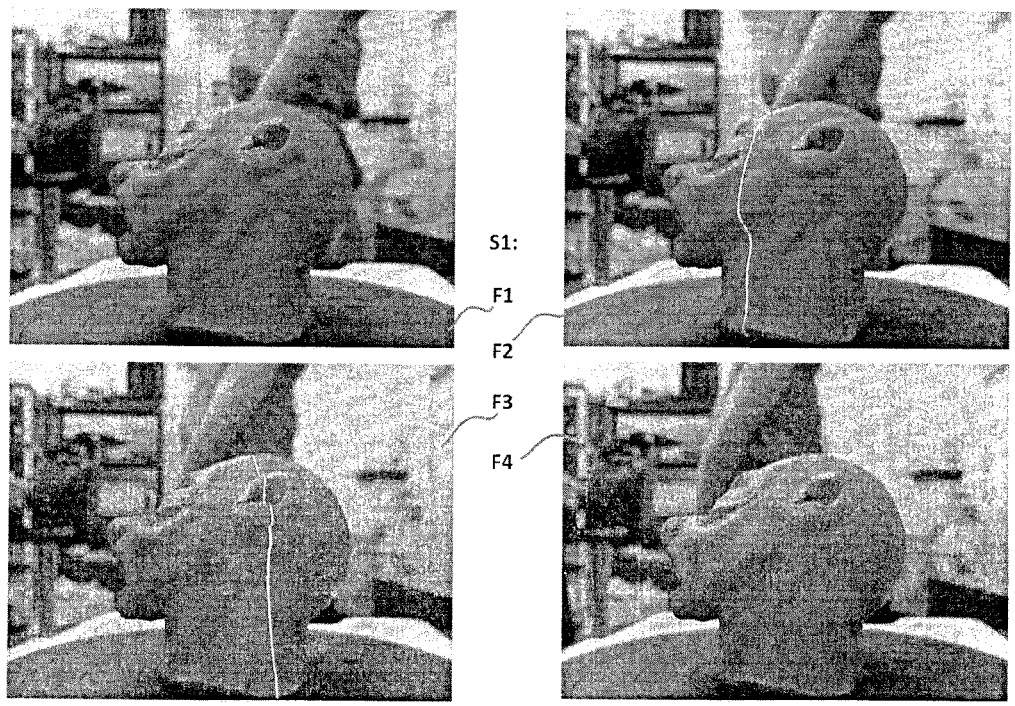
FIG. 8A shows an example series S1 of captured digital images F1, F2, F3, and F4.

FIG. 8A shows an example series S1 of captured digital images F1, F2, F3, and F4.

As can be seen, this series of digital images has a first image F1 captured while both IS-62 and IS-64 were OFF, a second image F2 captured while only IS-62 was ON, a third image captured while only IS-64 was ON, and a fourth image F4 captured while both IS-62 and IS-64 were OFF (as was first image F1). In F1 and F4, only ambient lighting is illuminating the object. Accordingly, there are two images (F2 and F3) in the series captured during the first illumination state (not all illumination sources OFF) between two images (F1 and F4) captured during the second illumination state (all illumination sources OFF). As such, for the series of digital images shown in Table 1, motion detection would proceed as described above and depicted in FIG. 8 using F1 as $F_A$, and F4 as $F_B$.

Figure 8B:
FIG. 8B shows a digital image generated from differences between digital images F1 and F4 in FIG. 8A, indicating interfering motion has occurred during capture of the series S1.

A casual visual comparison between digital images F1 and F4 will reveal that a person in the background of the digital images is in a different position in F1 than he/she is in F4. FIG. 8B shows a difference digital image generated from pixel-by-pixel differences between digital images F1 and F4 in FIG. 8A, denoted as Diff(F1,F4). It should be noted that FIG. 8B depicts in white all channels of the pixels (not just the red channels) in F1 and F4 that differ in intensity by greater than or equal to the threshold amount. As will be understood, this is presented for ease of understanding. It is preferred that only red channels be compared (for the embodiment using the red laser), since movement causing intensity differences in blue or green channels would not be registered as points on the object anyway, and processing just the red channels would require less processing.

Figure 9:
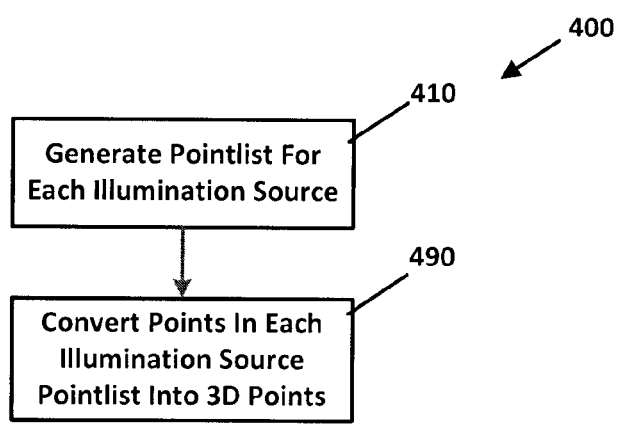
FIG. 9 is a flowchart depicting in further detail steps for processing captured digital images to determine object points, according to an embodiment.

FIG. 9 is a flowchart depicting in further detail steps for processing captured digital images to determine object points (step 400), according to an embodiment. A list of two-dimensional points in the captured digital images, referred to herein as a Pointlist, is generated for each illumination source of the illumination system (step 410). In this embodiment, there are two illumination sources IS-62 and IS-64. Each Pointlist is then converted into 3D coordinates (step 490) using triangulation as described above.

As indicated above, the process by which a Pointlist is generated for each illumination source depends upon the nature of the series of digital images captured by the imaging system, which generally depends on the number of illumination sources in the illumination system and the format selected for the first and second illumination states of the illumination system.

Figure 10:
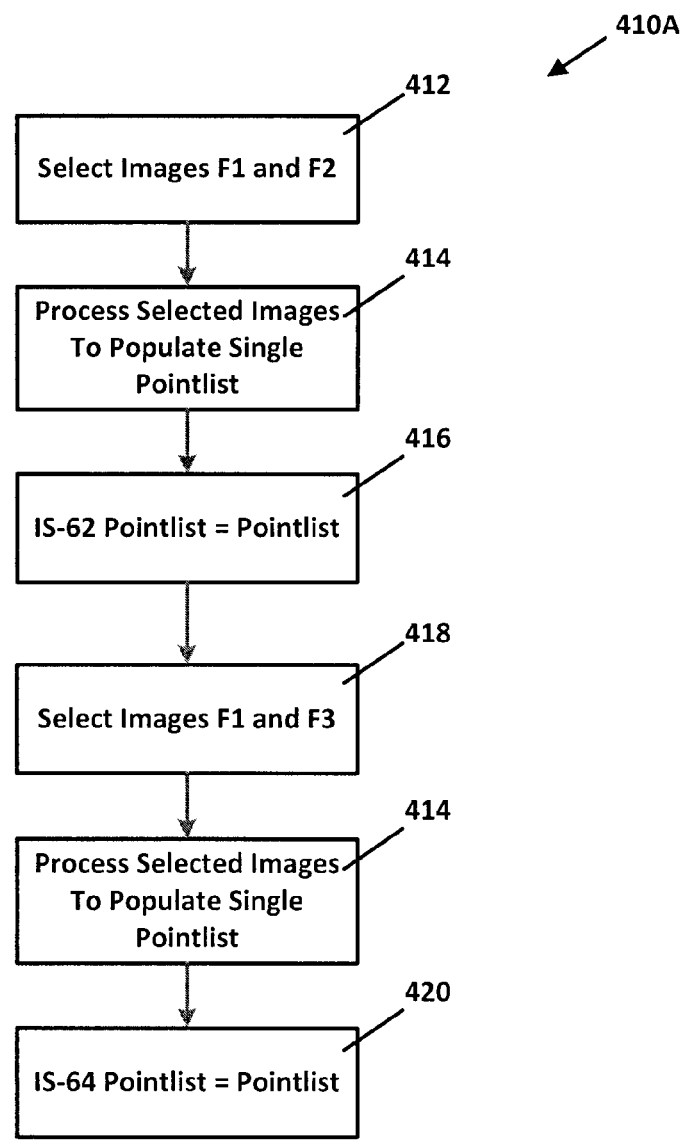
FIG. 10 is a flowchart depicting in further detail steps for generating Pointlists from a series of digital images captured using a device having two illumination sources, according to an embodiment.

FIG. 10 is a flowchart depicting in further detail steps in a method 410A for generating Pointlists from a series of digital images captured using a device having two illumination sources, such as that depicted in Table 1, according to an embodiment. Images F1 and F2 are selected (step 412), and these selected images are then processed to populate a single Pointlist (step 414), which is then considered the Pointlist for illumination source IS-62 (step 416). Following this, images F1 and F3 are then selected (step 418), and these selected images are then processed to populate a single Pointlist (step 414), which is then considered the Pointlist for illumination source IS-64 (step 420).

Figure 11:
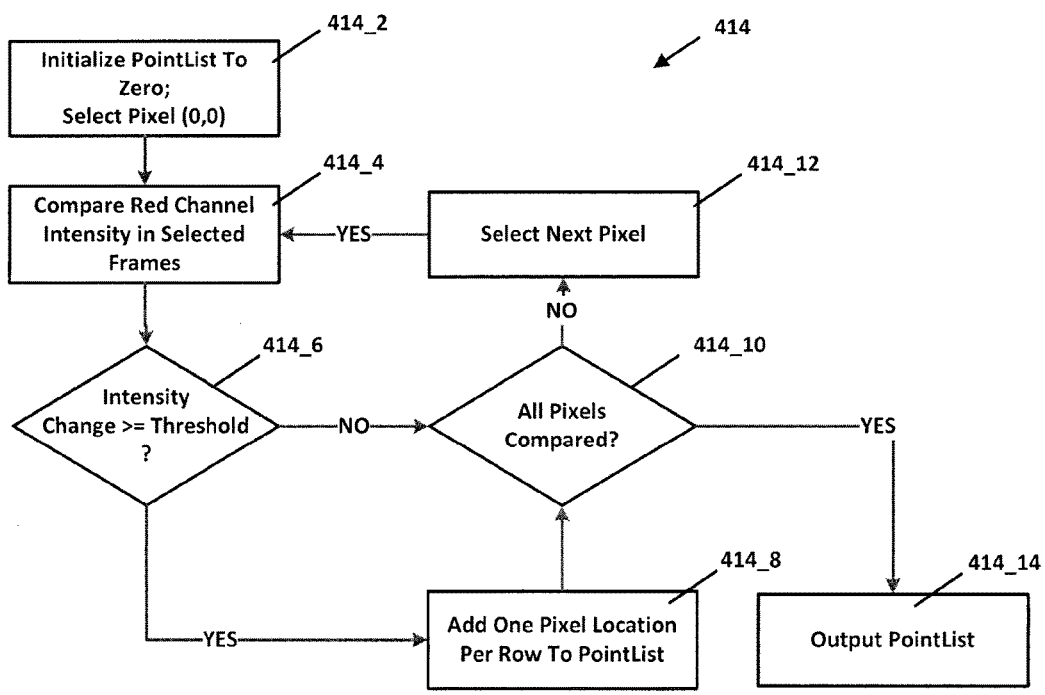
FIG. 11 is a flowchart depicting in further detail steps for processing selected images to populate a Pointlist, according to an embodiment.

FIG. 11 is a flow chart depicting, in further detail, processing a pair of selected frames to populate a single Pointlist (step 414) according to an embodiment. The Pointlist is initialized to have zero points, and a first pixel location, in this embodiment pixel location (0,0), is selected (step 4142). The intensity of the red channel at location (0,0) in one of the frames is compared to the intensity of the red channel at location (0,0) in the other frame (step 414_4). In the event that the intensity difference is greater than or equal to the threshold minimum amount (step 414_6), which in this embodiment is 30 bytes, then the pixel location (0,0) is considered a candidate for adding to the Pointlist (step 414_8). This is because, with no motion having been detected, the intensity difference should be due to the corresponding illumination source being ON in one of the images and OFF in the other image at pixel location (0,0), indicating that the beam of red radiation (when ON) being directed by its illumination source into the region of interest is reflecting off of a point on the object corresponding to pixel location (0,0) and back towards the imaging system.

If at step 414_6 it is determined that the intensity difference is not greater than or equal to (i.e., is less than) the threshold amount, then pixel location (0,0) is not considered to correspond to a candidate position on the object in the region of interest. Whichever pixel is selected, it is then determined whether all pixels have been compared in the manner described above (step 414_10). In the event that not all pixels have been compared in the manner described above, the next pixel is selected (step 414_12), and the process continues from step 414_4 for the newly selected pixel.

A given horizontal row of pixels may include several pixels whose red channels has been changed by more than the minimum threshold amount, such that there are multiple candidate object points in the row. This may occur if the width of the vertical laser stripe being directed into the region of interest is wider than a single pixel and/or as the angle of the surface on which the vertical laser stripe is incident approaches being parallel to the vertical laser stripe such that the laser stripe is spread along the surface. In this embodiment, for accuracy of scanning only one object point per horizontal row at a given rotational position is selected for being added to the Pointlist. A method for selecting the object point from a set of candidate object points in a horizontal row of pixels includes identifying the pixel whose red channel has the highest intensity over the minimum threshold amount, then determining whether the red channel of the pixel to the left of the highest intensity pixel or the red channel of the pixel to the right of the highest intensity pixel has the higher intensity. The pixel having the highest intensity red channel of the two is identified such that there are two pixels identified (i.e., the highest intensity red channel pixel in the row and the highest intensity red channel pixel of the pixels to the left and to the right of the highest intensity red channel pixel). Next, it is determined whether the red channel of the pixel to the left of the two identified pixels or the red channel of the pixel to the right of the two identified pixels has the higher intensity. The pixel with the red channel having the highest intensity of the two is identified such that there are now three pixels identified. Next, it is determined whether the red channel of the pixel to the left of the three identified pixels or the red channel of the pixel to the right of the three identified pixels has the higher intensity. The pixel having the highest intensity red channel of the two is identified such that there are now four pixels identified. Next, it is determined whether the red channel of the pixel to the left of the four identified pixels or the red channel of the pixel to the right of the four identified pixels has the higher intensity. The pixel having the highest intensity red channel of the two is identified such that there are now five pixels identified.

With a series of five pixels having been identified as described above, the middle pixel (i.e., the third pixel in the series) is selected as the object point to be added to the Pointlist for that horizontal row.

The process of selecting an object point from a set of candidate object points described above enables object point selection to be adaptable to different intensity conditions on different points of the object being scanned. The series of pixels including the pixel having the higher intensity above the minimum threshold can be longer or shorter depending upon the implementation.

The above process will repeat for all pixels in the pair of digital images until it is determined at step 414_10 that all pixels have been compared, at which point the Pointlist is complete and may be outputted (step 414_14). It will be understood that if no object is in the region of interest, then no beam of red radiation directed into the region of interest will be reflected back off of anything towards the imaging system, and the Pointlist will have zero points in it when outputted. Similarly, even if an object is in the region of interest, should the beam of red radiation from the corresponding illumination source simply not intersect the object, then no beam of red radiation will be reflected back towards the imaging system, and the Pointlist will have zero points in it when output.

Figure 11A:
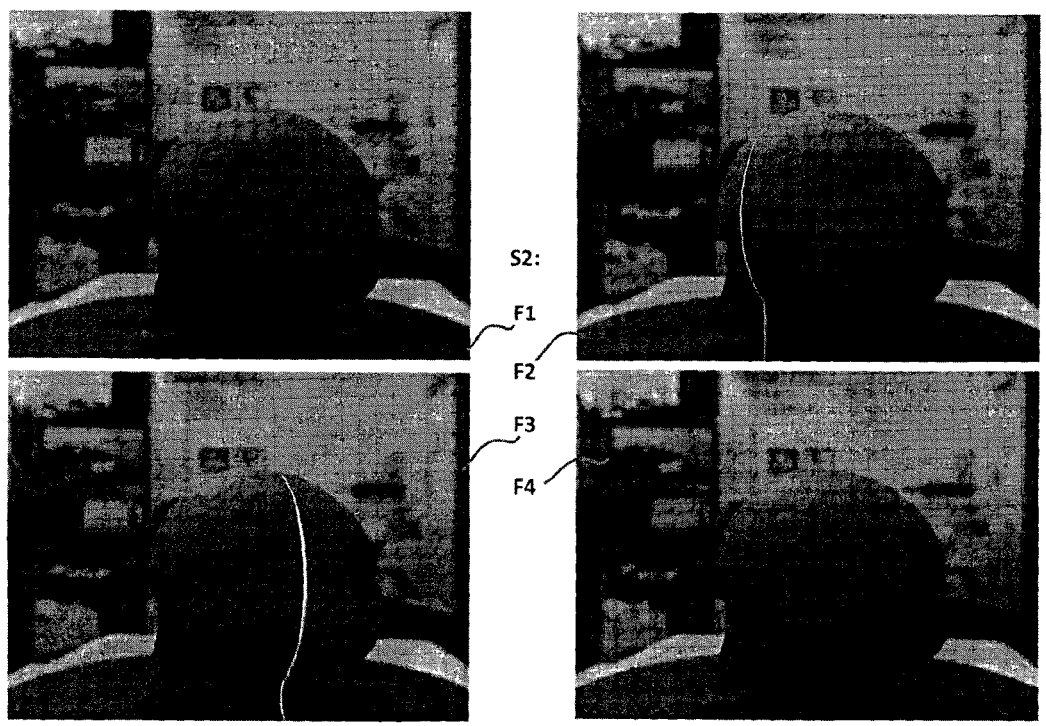
FIG. 11A shows another example series S2 of captured digital images F1, F2, F3, and F4.
Figure 11B:
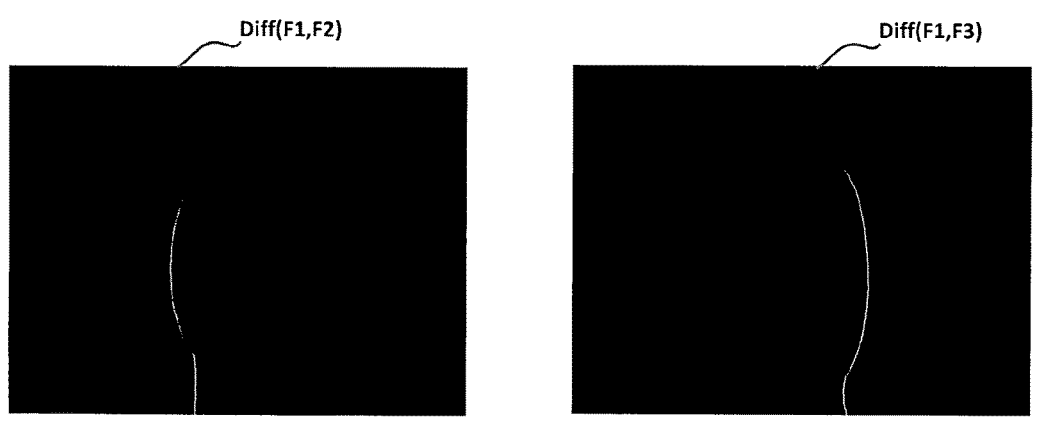
FIG. 11B shows digital images generated from differences between digital images F1 and F2, and from differences between digital images F1 and F2 of the series S2 in FIG. 9A.

FIG. 11A shows another example series S2 of captured digital images F1, F2, F3, and F4. FIG. 11B shows difference digital images Diff(F1,F2) and Diff(F1,F3) generated from differences between digital images F1 and F2, and from differences between digital images F1 and F2 of the series S2 shown in FIG. 11A. The IS-62 Pointlist contains the points shown in white in FIG. 11B in the Diff(F1,F2) image, and the IS-64 Pointlist contains the points shown in white in FIG. 11B in the Diff(F1,F3) image.

With the IS-62 Pointlist and the US-64 Pointlist having been populated, the points in each Pointlist are converted to 3D points by triangulation.

During conversion of each 2D point in the Pointlists into 3D points, the upper left corner of the digital image is considered position (0,0), and a number of parameters are employed. These parameters include the width and height in pixels of digital images captured by the imaging device 52, the horizontal field of view (HFOV) of the imaging device 52 in degrees, the rotation offset of the imaging device 52, in terms of yaw and roll, and the position of the origin of each of the imaging device 52 and the illumination sources IS-62 and IS-64 relative to the centre of the object support surface 16 (0,0,0). The axis A is aligned with the imaging device 52. For each 2D point, an initial 3D position relative to imaging device 52 is calculated by presupposing that the point that the axis A contacts the object support surface 16 (i.e., point (0,0,0)) is at the centre of the field of view of the imaging device 52. This may not be the case as it is based on the mechanical alignments of the device 10, but is suitable for the initial 3D point being calculated. Based on the distance from the imaging device 52 to point (0,0,0) as well as the HFOV of the imaging device 52, the ratio of pixels per millimeter is calculated for the distance. For each 2D point, its distance in pixels from the centre is determined, and using the ratio of pixels per millimeter its projected point on an imaginary plane that is perpendicular to the normal of the imaging device 52. A 3D transformation is then applied to the projected point in order to compensate for the roll of the imaging device 52. Based on the 3D transformed projected point and 3D points identified during calibration on a calibration card identifying the laser's plane, the true 3D transformed point is identified by finding the intersection of the 3D transformed projected point with the laser's plane thereby to compensate for mechanical alignments of device 10, and then the yaw of the imaging device 52 is used to further process the 3D transformed projected point.

Although embodiments have been described with reference to the drawings, those of skill in the art will appreciate that variations and modifications may be made without departing from the spirit, scope and purpose of the invention as defined by the appended claims.

For example, alternative configurations of controller 1000, such as those that are not interacted with directly by a human user through a graphical or text user interface, may be employed. For example, alternatively a computing system having similar components as controller 1000 could be integrated more tightly with the components of device 10. For example, a controller onboard device 10, for example within the body of the scanner support component 22, could cause the illumination system 60 to switch and the imaging system 50 to capture sequences of digital images as described above. Such a controller could similarly store captured digital images and conduct onboard processing to create Pointlists for onboard storage or outputting via a network interface such as USB port 82 to another computer, for further processing in order to convert the generated Pointlists into point clouds and/or surface renderings. Alternatively, the conversion into 3D points could be done completely onboard, such that the onboard computing system would simply output an appropriate point cloud that could be stored or processed on an external computing system, or transmitted by wire or wirelessly through a network or directly to another device such as a 3D printer, or for further processing into a 3D surface rendering. Alternatively, the rendering could be done onboard by such an onboard controller, such that the full three-dimensional rendering can be outputted.

While in embodiments described above, the illumination system having only two illumination sources is in its second illumination state when both of the illumination sources are OFF (OFF-OFF), and is otherwise in the first illumination state, alternatives are contemplated. For example, in an alternative embodiment, the illumination system having only two illumination sources is in its second illumination state when both of the illumination sources are ON (ON-ON).

For example, a four-image series of digital images F1-F4 for an illumination system 60 having two illumination sources IS-62 and IS-64 (such as that shown in FIG. 1), where the second illumination state of the illumination system 60 occurs only when both illumination sources IS-62 and IS-64 are ON, is shown in Table 2 below:

TABLE 2

|       | F1  | F2  | F3  | F4  |
|-------|-----|-----|-----|-----|
| IS-62 | ON  | OFF | ON  | ON  |
| IS-64 | ON  | ON  | OFF | ON  |

As can be seen, this series of digital images has a first digital image F1 captured while both IS-62 and IS-64 were ON, a second digital image F2 captured while only IS-62 was OFF, a third digital image captured while only IS-64 was OFF, and a fourth digital image F4 captured while both IS-62 and IS-64 were ON (as was first image F1). Accordingly, there are two digital images (F2 and F3) in the series captured during the first illumination state (not all illumination sources ON) between two digital images (F1 and F4) captured during the second illumination state (all illumination sources ON). As such, similar to the series of digital images shown in Table 1, for the series of digital images shown in Table 2, motion detection would proceed as described above and depicted in FIG. 8 using F1 as $F_A$, and F4 as $F_B$.

Furthermore, the process 410A could be used to generate Pointlists for the series of digital images depicted in Table 2, above.

In another embodiment in which the illumination system has only a single illumination source, the illumination system is in its second illumination state only if the single illumination source is OFF, and is otherwise in its first illumination state.

For example, a three-image series of digital images F1-F3 for an illumination system having only one illumination source IS-62, where the second illumination state of the illumination system occurs only when illumination source IS-62 is OFF, is shown in Table 3 below:

TABLE 3

|       | F1  | F2  | F3  |
|-------|-----|-----|-----|
| IS-62 | OFF | ON  | OFF |

As can be seen, this series of digital images has a first digital image F1 captured while IS-62 was OFF, a second digital image F2 captured while IS-62 was ON, and a third digital image captured while IS-62 was OFF (as was first image F1). Accordingly, there is one digital image (F2) in the series captured during the first illumination state (the illumination source is ON) between two digital images (F1 and F3) captured during the second illumination state (the illumination source is OFF). As such, for the series of digital images shown in Table 1, motion detection would proceed as described above and depicted in FIG. 8 using F1 as $F_A$, and F3 as $F_B$.

In another embodiment in which the illumination system has only a single illumination source, the illumination system is in its second illumination state only if the single illumination source is ON, and is otherwise in its first illumination state.

For example, a three-image series of digital images F1-F3 for an illumination system having only one illumination source IS-62, where the second illumination state of the illumination system is established only when illumination source IS-62 is ON, is shown in Table 4 below:

TABLE 4

|       | F1  | F2  | F3  |
|-------|-----|-----|-----|
| IS-62 | ON  | OFF | ON  |

As can be seen, this series of digital images has a first digital image F1 captured while IS-62 was ON, a second digital image F2 captured while IS-62 was OFF, and a third digital image captured while IS-62 was ON (as was first image F1). Accordingly, there is one digital image (F2) in the series captured during the first illumination state (the illumination source is OFF) between two digital images (F1 and F3) captured during the second illumination state (the illumination source is ON). As such, similar to the series of digital images shown in Table 3, for the series of digital images shown in Table 4, motion detection would proceed as described above and depicted in FIG. 8 using F1 as $F_A$, and F3 as $F_B$.

Figure 12:
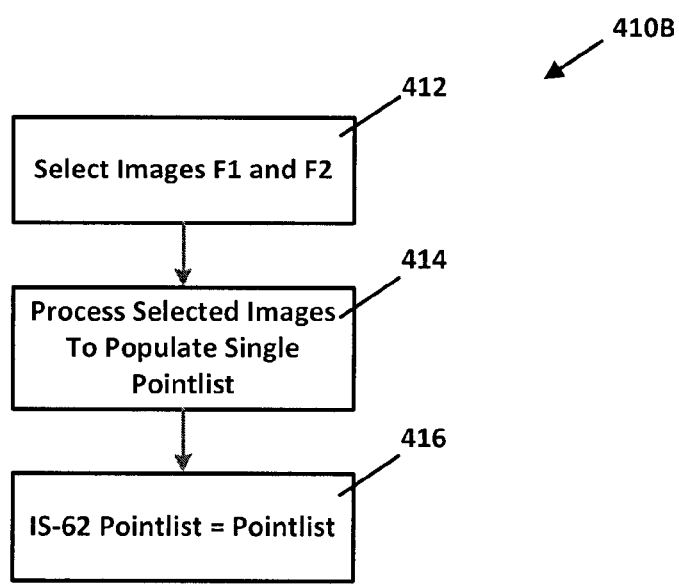
FIG. 12 is a flowchart depicting in further detail steps for generating a Pointlist from a series of digital images captured using a device with one illumination source, according to an embodiment.

A process 410B for generating a Pointlist for the series of digital images depicted in Table 3 or the series of digital images depicted in Table 4, above, is shown in FIG. 12. Digital images F1 and F2 are selected (step 412), and these selected digital images are then processed to populate a single Pointlist (step 414), which is then considered the Pointlist for illumination source IS-62 (step 416).

Alternative embodiments are contemplated in which an illumination system includes three illumination sources IS-62, IS-64 and IS-66.

In an embodiment in which the illumination system has three illumination sources, the illumination system is in its second illumination state only if all three illumination sources are OFF, and is otherwise in its first illumination state. For example, a five-image series of digital images F1-F5 for an illumination system having three illumination sources IS-62, IS-64 and IS-66, where the second illumination state of the illumination system occurs only when all three illumination sources IS-62, IS-64 and IS-66 are OFF, is shown in Table 5 below:

TABLE 5

|       | F1  | F2  | F3  | F4  | F5  |
|-------|-----|-----|-----|-----|-----|
| IS-62 | OFF | ON  | OFF | OFF | OFF |
| IS-64 | OFF | OFF | ON  | OFF | OFF |
| IS-66 | OFF | OFF | OFF | ON  | OFF |

As can be seen, this series of digital images has a first digital image F1 captured while all of IS-62, IS-64 and IS-66 were OFF, a second digital image F2 captured while only IS-62 was ON, a third digital image captured while only IS-64 was ON, a fourth digital image F4 captured while only IS-66 was ON, and a fifth digital image F5 captured while all of IS-62, IS-64 and IS-66 were OFF (as was first image F1). Accordingly, there are three digital images (F2, F3 and F4) in the series captured during the first illumination state (not all illumination sources OFF) between two digital images (F1 and F5) captured during the second illumination state (all illumination sources OFF). As such, for the series of digital images shown in Table 5, motion detection would proceed as described above and depicted in FIG. 3 using F1 as $F_A$, and F5 as $F_B$.

In another embodiment in which the illumination system has three illumination sources, the illumination system is in its second illumination state only if all three illumination sources are ON, and is otherwise in its first illumination state. For example, a five-image series of digital images F1-F5 for an illumination system having three illumination sources IS-62, IS-64 and IS-66, where the second illumination state of the illumination system occurs only when all three illumination sources IS-62, IS-64 and IS-66 are ON, is shown in Table 6 below:

TABLE 6

|       | F1  | F2  | F3  | F4  | F5  |
|-------|-----|-----|-----|-----|-----|
| IS-62 | ON  | OFF | ON  | ON  | ON  |
| IS-64 | ON  | ON  | OFF | ON  | ON  |
| IS-66 | ON  | ON  | ON  | OFF | ON  |

As can be seen, this series of digital images has a first digital image F1 captured while all of IS-62, IS-64 and IS-66 were ON, a second digital image F2 captured while only IS-62 was OFF, a third digital image captured while only IS-64 was OFF, a fourth digital image F4 captured while only IS-66 was OFF, and a fifth digital image F5 captured while all of IS-62, IS-64 and IS-66 were ON (as was first image F1). Accordingly, there are three digital images (F2, F3 and F4) in the series captured during the first illumination state (not all illumination sources ON) between two digital images (F1 and F5) captured during the second illumination state (all illumination sources ON). As such, similar to the series of digital images shown in Table 5, for the series of digital images shown in Table 6, motion detection would proceed as described above and depicted in FIG. 3 using F1 as $F_A$, and F5 as $F_B$.

Figure 13:
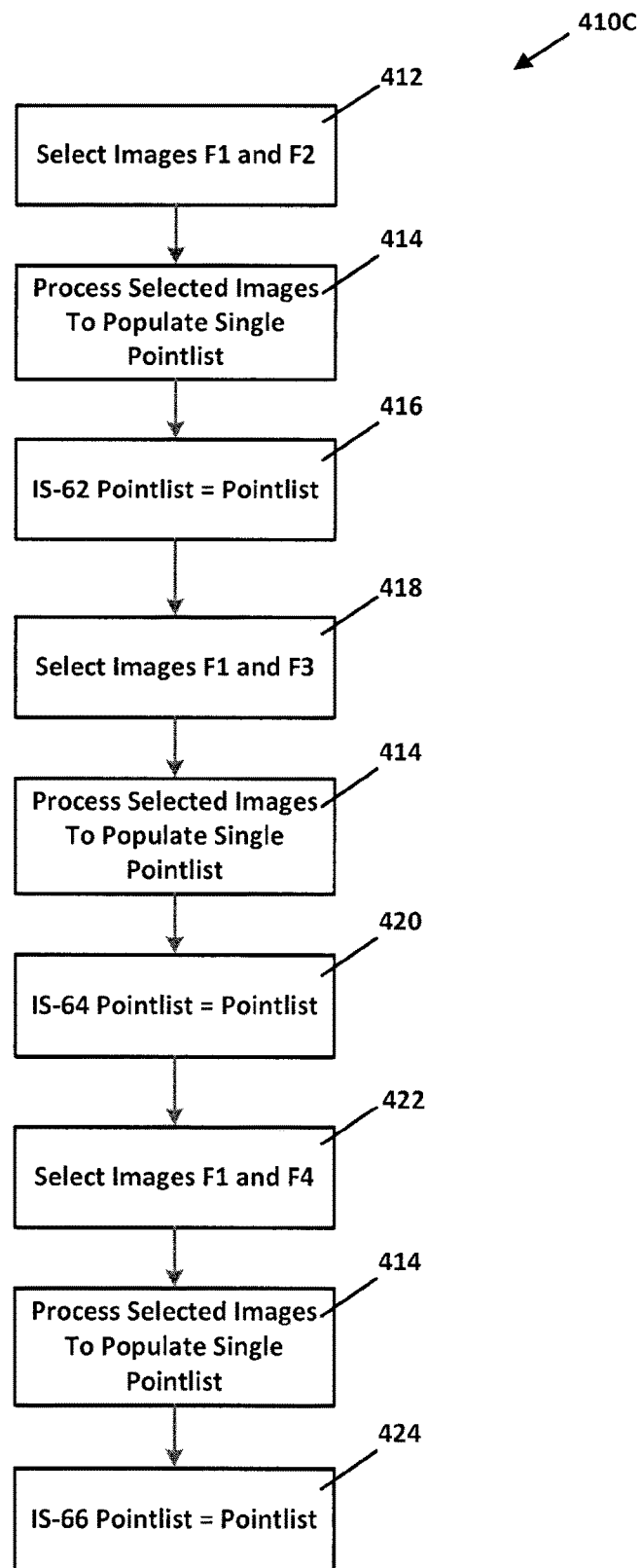
FIG. 13 is a flowchart depicting in further detail steps for generating Pointlists from a series of digital images captured using a device with three illumination sources, according to an embodiment.

A process 410C for generating a Pointlist for the series of digital images depicted in Table 5 or for the series of digital images depicted in Table 6, above, is shown in FIG. 13. Digital images F1 and F2 are selected (step 412), and these selected digital images are then processed to populate a single Pointlist (step 414), which is then considered the Pointlist for illumination source IS-62 (step 416). Following this, digital images F1 and F3 are then selected (step 418), and these selected digital images are then processed to populate a single Pointlist (step 414), which is then considered the Pointlist for illumination source IS-64 (step 420). Following this, digital images F1 and F4 are then selected (step 422), and these selected digital images are then processed to populate a single Pointlist (step 414), which is then considered the Pointlist for illumination source IS-66 (step 424).

It may be desirable to capture a series of digital images that includes more than two digital images captured while an illumination system is in its second illumination state. For example, as the number of illumination sources increases, more images are required to be captured. As a given series of digital images increases in length, it is less likely that motion or other interference occurring during capture of the series of digital images will be detectable using just the first and last digital images (i.e., those captured while the illumination system is in the second illumination state). This is because as the series length increases, it simply becomes more likely that motion could occur during the first illumination state but not during the second illumination state. Therefore, it may be desirable to interpose in the series of digital images additional images captured while the illumination system is in the second illumination state.

For example, a five-image series of digital images F1-F5 for an illumination system having two illumination sources IS-62 and IS-64, where the second illumination state of the illumination system occurs only when both illumination sources IS-62 and IS-64 are OFF, is shown in Table 7 below:

TABLE 7

|       | F1  | F2  | F3  | F4  | F5  |
|-------|-----|-----|-----|-----|-----|
| IS-62 | OFF | ON  | OFF | OFF | OFF |
| IS-64 | OFF | OFF | OFF | ON  | OFF |

As can be seen, this series of digital images has a first digital image F1 captured while both of IS-62 and IS-64 were OFF, a second digital image F2 captured while only IS-62 was ON, a third digital image captured while both of IS-62 and IS-64 were OFF (as was first image F1), a fourth digital image captured while only IS-64 was ON, and a fifth digital image F5 captured while both of IS-62 and IS-64 were OFF (as was first image F1). Accordingly, there is a digital image (F2) in the series captured during the first illumination state (not all illumination sources OFF) between two digital images (F1 and F3) captured during the second illumination state (all illumination sources OFF), and a digital image (F4) captured during the first illumination state (not all illumination sources OFF) between two digital images (F3 and F5) captured during the second illumination state (all illumination sources OFF). As such, for the series of digital images shown in Table 7, motion detection could proceed as described above and depicted in FIG. 8 using F1 as $F_A$ and F3 as $F_B$, then using F3 as $F_A$, and F5 as $F_B$. Alternatively, it could also proceed as described above and depicted in FIG. 8 using simply F1 as $F_A$, and F5 as $F_B$.

Figure 14:
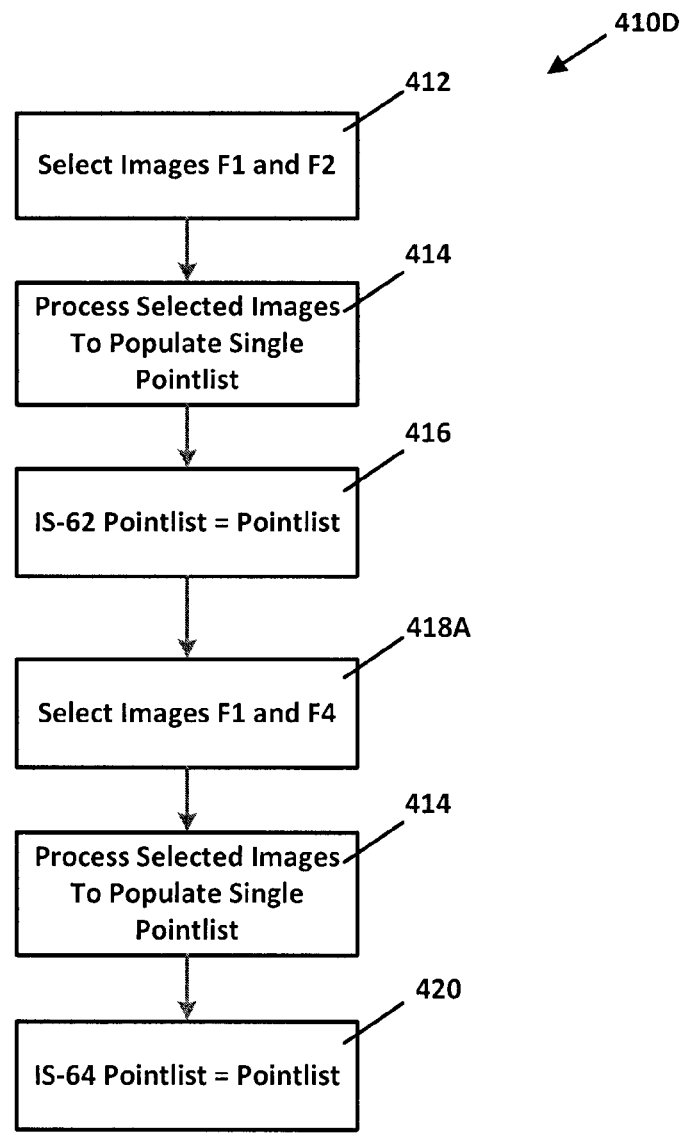
FIG. 14 is a flowchart depicting in further detail steps for generating Pointlists from an alternative series of digital images captured using a device having two illumination sources, according to an embodiment.

A process 410D for generating a Pointlist for the series of digital images depicted in Table 7, above, is shown in FIG. 14. Digital images F1 and F2 are selected (step 412), and these selected digital images are then processed to populate a single Pointlist (step 414), which is then considered the Pointlist for illumination source IS-62 (step 416). Following this, digital images F1 and F4 are then selected (step 418A), and these selected digital images are then processed to populate a single Pointlist (step 414), which is then considered the Pointlist for illumination source IS-64 (step 420).

As another example of capturing more than two digital images while the illumination system is in the second illumination state, a seven-image series of digital images F1-F7 for an illumination system having three illumination sources IS-62, IS-64 and IS-66, where the second illumination state of the illumination system occurs only when illumination sources IS-62, IS-64 and IS-66 are all OFF, is shown in Table 8 below:

TABLE 8

|       | F1  | F2  | F3  | F4  | F5  | F6  | F7  |
|-------|-----|-----|-----|-----|-----|-----|-----|
| IS-62 | OFF | ON  | OFF | OFF | OFF | OFF | OFF |
| IS-64 | OFF | OFF | OFF | ON  | OFF | OFF | OFF |
| IS-66 | OFF | OFF | OFF | OFF | OFF | ON  | OFF |

As can be seen, this series of digital images has a first digital image F1 captured while all of IS-62, IS-64 and IS-66 were OFF, a second digital image F2 captured while only IS-62 was ON, a third digital image F3 captured while all of IS-62, IS-64 and IS-66 were OFF (as was first image F1), a fourth digital image F4 captured while only IS-64 was ON, a fifth digital image F5 captured while all of IS-62, IS-64 and IS-66 were OFF (as were first image F1 and third image F3), a sixth digital image F6 captured while only IS-66 was ON, and a seventh digital image F7 captured while all of IS-62, IS-64 and IS-66 were OFF (as were first image F1, third image F3 and fifth image F5). Accordingly, there is a digital image (F2) in the series captured during the first illumination state (not all illumination sources OFF) between two digital images (F1 and F3) captured during the second illumination state (all illumination sources OFF), a digital image (F4) captured during the first illumination state (not all illuminations sources OFF) between two digital images (F3 and F5) captured during the second illumination state (all illumination sources OFF), and a digital image (F6) captured during the first illumination state (not all illumination sources OFF) between two digital images (F5 and F7) captured during the second illumination state (all illumination sources OFF). As such, for the series of digital images shown in Table 8, motion detection could proceed as described above and depicted in FIG. 8 using F1 as $F_A$, and F3 as $F_B$, then using F3 as $F_A$, and F5 as $F_B$, then using F5 as $F_A$, and F7 as $F_B$. Alternatively, it could also proceed as described above and depicted in FIG. 8 using simply F1 as $F_A$, and F7 as $F_B$.

Figure 15:
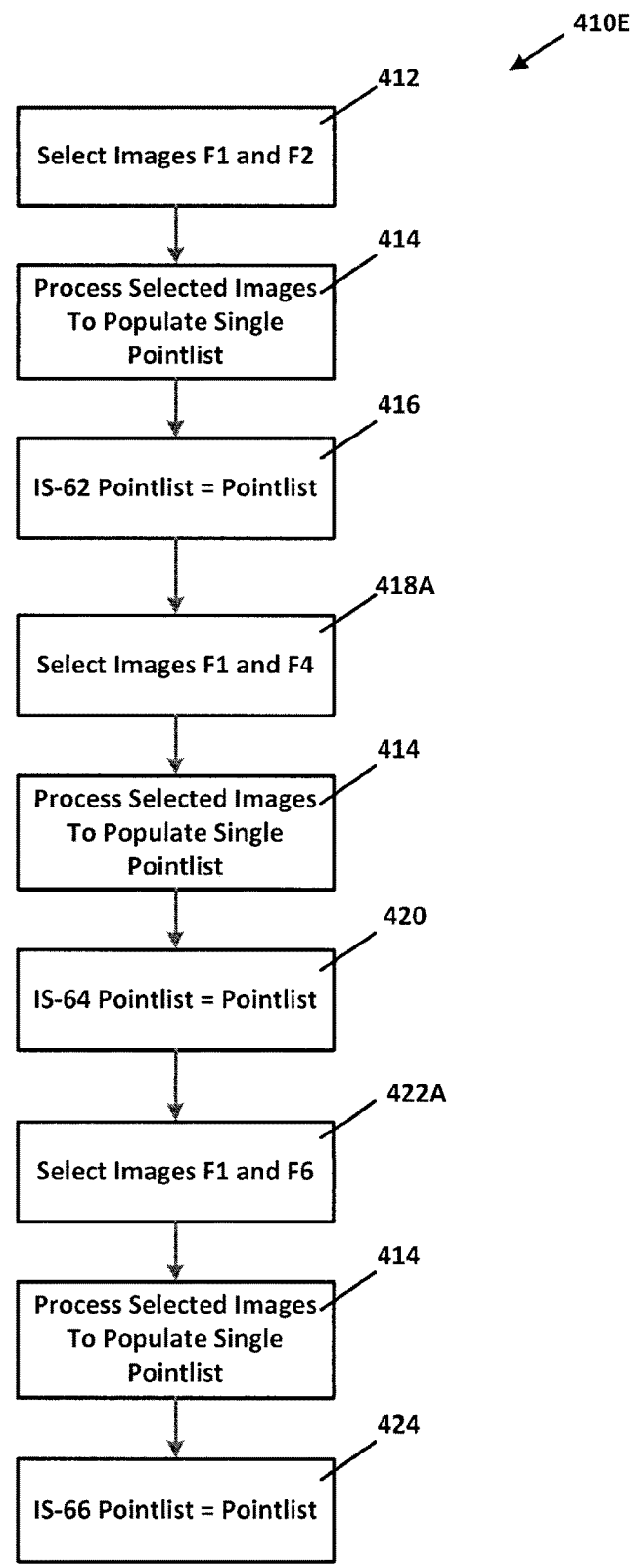
FIG. 15 is a flowchart depicting in further detail steps for generating Pointlists from an alternative series of digital images captured using a device with three illumination sources, according to an embodiment.

A process 410E for generating a Pointlist for the series of digital images depicted in Table 8, above, is shown in FIG. 15. Digital images F1 and F2 are selected (step 412), and these selected digital images are then processed to populate a single Pointlist (step 414), which is then considered the Pointlist for illumination source IS-62 (step 416). Following this, digital images F1 and F4 are then selected (step 418A), and these selected digital images are then processed to populate a single Pointlist (step 414), which is then considered the Pointlist for illumination source IS-64 (step 420). Following this, digital images F1 and F4 are then selected (step 422A), and these selected digital images are then processed to populate a single Pointlist (step 414), which is then considered the Pointlist for illumination source IS-66 (step 424).

Alternative embodiments are contemplated in which the illumination system could be considered in the second illumination state only while all of the illumination sources are in respective predetermined ON-OFF states, and would otherwise be in the first illumination state. This is a general case of the all-OFF or all-ON embodiments described above. However, while certain examples of this general case can provide for potential reduction in the number of digital images in a series, the reader should be aware of the potential drawback of using certain series of digital images being that a point or points on the object on which all beams of radiation are incident at the same time (i.e., points on the object that happen to be on the axis A for embodiments described above) would not be identified according to the methods described above as points on the object, because there would not be a sufficient intensity difference between such points in the digital images in the series.

For example, a three-image series of digital images F1-F3 for an illumination system having two illumination sources IS-62 and IS-64, where the second illumination state of the illumination system occurs only when IS-62 is ON at the same time that IS-64 is OFF, is shown in Table 9 below:

TABLE 9

|       | F1  | F2  | F3  |
|-------|-----|-----|-----|
| IS-62 | ON  | OFF | ON  |
| IS-64 | OFF | ON  | OFF |

As can be seen, this series of digital images has a first digital image F1 captured while IS-62 was ON and IS-64 was OFF, a second digital image F2 captured while IS-62 was OFF and IS-64 was ON, and a third digital image captured while IS-62 was ON and IS-64 was OFF (as was first image F1). Accordingly, there is one digital image (F2) in the series captured during the first illumination state (OFF-ON) between two digital images (F1 and F3) captured during the second illumination state (ON-OFF). As such, for the series of digital images shown in Table 9, motion detection would proceed as described above and depicted in FIG. 8 using F1 as $F_A$, and F3 as $F_B$.

Figure 16:
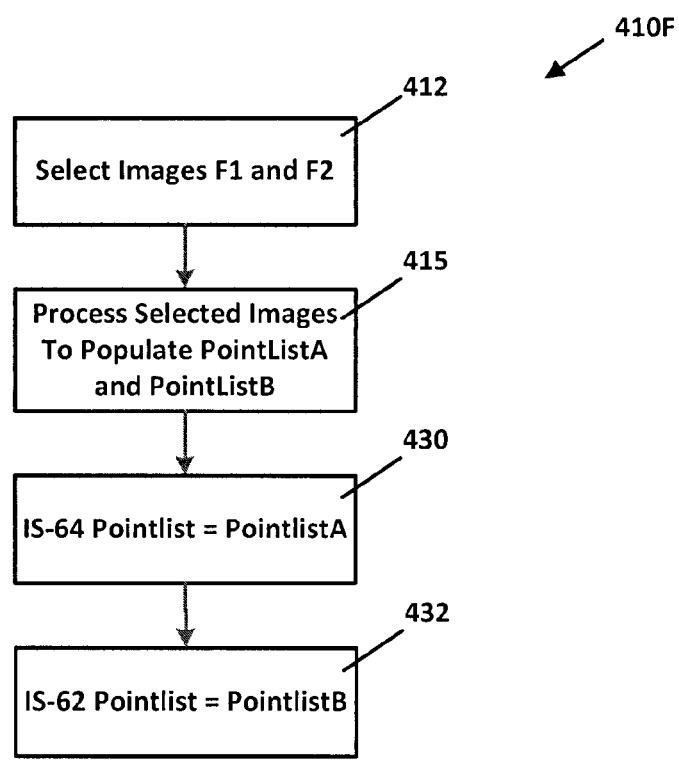
FIG. 16 is a flowchart depicting in further detail alternative steps for generating Pointlists from an alternative series of digital images captured using a device having two illumination sources, according to an embodiment.

A process 410F for generating a Pointlist for each of the illumination sources IS-62 and IS-64 for the series of digital images depicted in Table 9, above, is shown in FIG. 16. Digital images F1 and F2 are selected (step 412), and these selected digital images are then processed to populate two Pointlists identified for the purposes of this description as PointListA and PointListB (step 415). PointlistA is then considered the Pointlist for illumination source IS-64 (step 430), and PointlistB is considered the Pointlist for illumination source IS-62 (step 432).

With respect to process 410F and the series of digital images in Table 9, when digital images F1 and F2 are selected for processing, should there be one or more points on the object in the region of interest at which the radiation beams from IS-62 and IS-64 are incident, there will be no or little change to be detected in step 415. This is because at the point of such incidence, in digital image F1it will be illuminated by IS-62 and not by IS-64, but in digital image F2 it will be illuminated by IS-64 and not by IS-62. As such, the series of digital images in Table 9, and the corresponding process for determining PointlistA and PointlistB will not be able to detect points on the object in the region of interest on which both the beam of radiation from illumination source IS-62 and the beam of radiation from illumination source IS-64 are incident. For this reason, there may be a trade-off between the ability to detect points and the amount of processing required.

Figure 17:
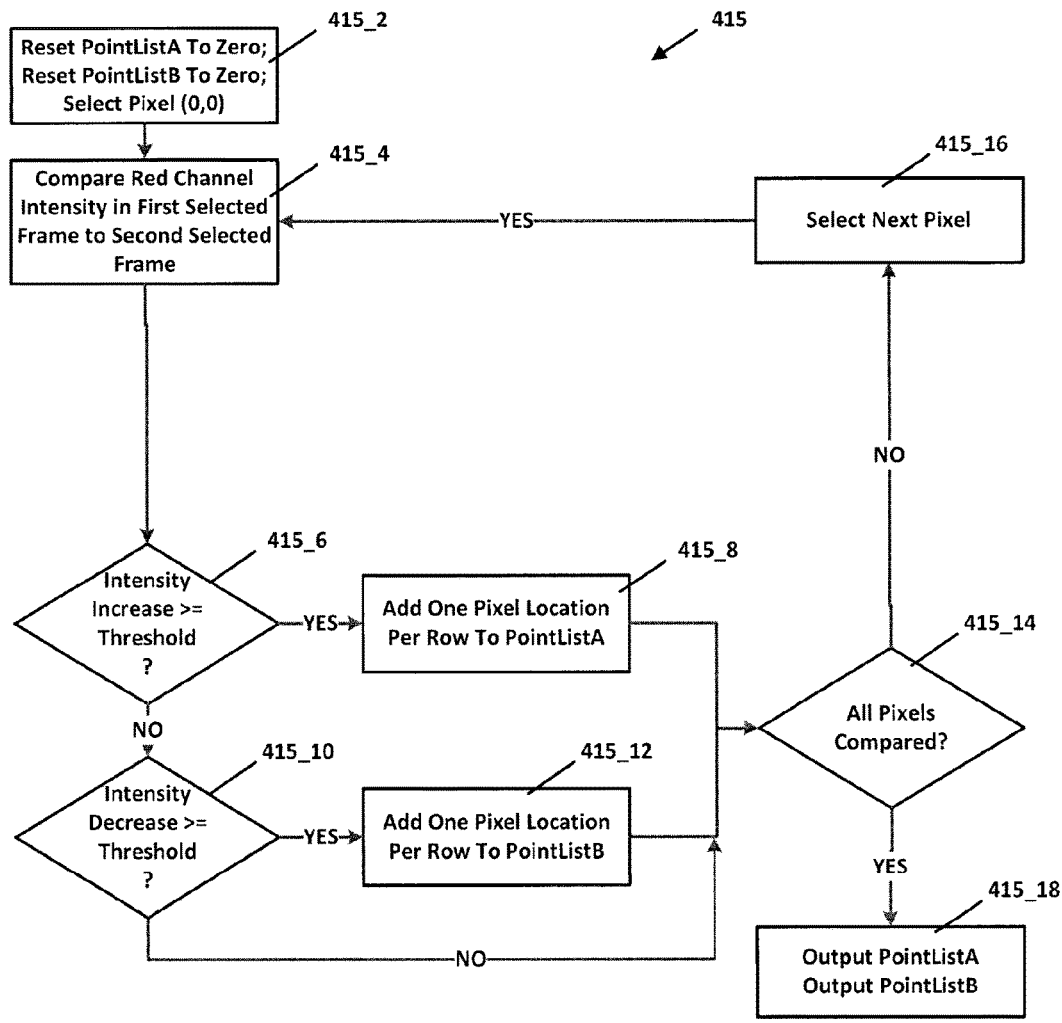
FIG. 17 is a flowchart depicting in further detail steps for processing selected images to populate two Pointlists, according to an embodiment.

FIG. 17 is a flow chart depicting, in further detail, processing a pair of selected frames to populate PointlistA and PointlistB (step 415) according to an embodiment. Each of PointlistA and PointlistB is initialized to have zero points, and a first pixel location, in this embodiment pixel location (0,0), is selected (step 415_2). The intensity of the red channel at pixel location (0,0) in the first of the selected frames is then compared to the intensity of the red channel at pixel location (0,0) in the second of the selected frames (step 415_4). In the event that there is an intensity increase from the first frame to the second frame that is greater than or equal to a threshold amount (step 415_6), which in this embodiment is 30 bytes, then the pixel location (0,0) is considered a candidate for adding to PointlistA (step 415_8). This is because, with no motion having been detected, the intensity difference should be due to the corresponding red illumination source being OFF in the first images and ON in the second image at pixel location (0,0), indicating that the red beam of radiation (when ON) being directed by that corresponding illumination source into the region of interest is reflecting off of a point on the object corresponding to pixel location (0,0) and back towards the imaging system.

However, if at step 415_6 it is determined that the red channel intensity increase at pixel (0,0) from the first frame to the second frame is not greater than or equal to (i.e., is less than) the threshold amount, then in the event that there is an intensity decrease from the first frame to the second frame that is greater than or equal to the threshold amount (step 415_10), then the pixel location (0,0) is added to PointlistB (step 415_12). Otherwise, pixel location (0,0) is not considered to correspond to a position on the object in the region of interest.

The method described above for selecting the object point from a set of candidate object points in a horizontal row of pixels may be conducted in order to select one object point per horizontal row.

Whichever pixel is selected, it is then determined whether all pixels have been compared in the manner described above (step 415_114). In the event that not all pixels have been compared in the manner described above, the next pixel is selected (step 415_16), and the process continues from step 415_4 for the newly selected pixel. This process will repeat for all pixels in the pair of digital images until it is determined at step 415_14 that all pixels have been compared, at which point PointlistA and PointlistB are complete and may be outputted (step 415_18).

As another example, a four-image series of digital images F1-F4 for an illumination system having three illumination sources IS-62, IS-64 and IS-66, where the second illumination state of the illumination system occurs only when IS-62 is ON at the same time that both IS-64 and IS-66 are OFF, is shown in Table 10 below:

TABLE 10

|       | F1  | F2  | F3  | F4  |
|-------|-----|-----|-----|-----|
| IS-62 | ON  | OFF | OFF | ON  |
| IS-64 | OFF | ON  | OFF | OFF |
| IS-66 | OFF | OFF | ON  | OFF |

As can be seen, this series of digital images has a first digital image F1 captured while IS-62 was ON and both IS-64 and IS-66 were OFF, a second digital image F2 captured while both IS-62 and IS-66 were OFF and IS-64 was ON, a third digital image F3 captured while both IS-62 and IS-64 were ON and IS-66 was OFF, and a digital fourth image F4 captured while IS-62 was ON and both IS-64 and IS-66 were OFF (as was first digital image F1). Accordingly, there are two digital images (F2 and F3) in the series captured during the first illumination state (OFF-ON-OFF and OFF-OFF-ON each cause illumination system to be in the first illumination state) between two digital images (F1 and F4) captured during the second illumination state (ON-OFF-OFF). As such, for the series of digital images shown in Table 10, motion detection would proceed as described above and depicted in FIG. 8 using F1 as $F_A$, and F4 as $F_B$.

Figure 18:
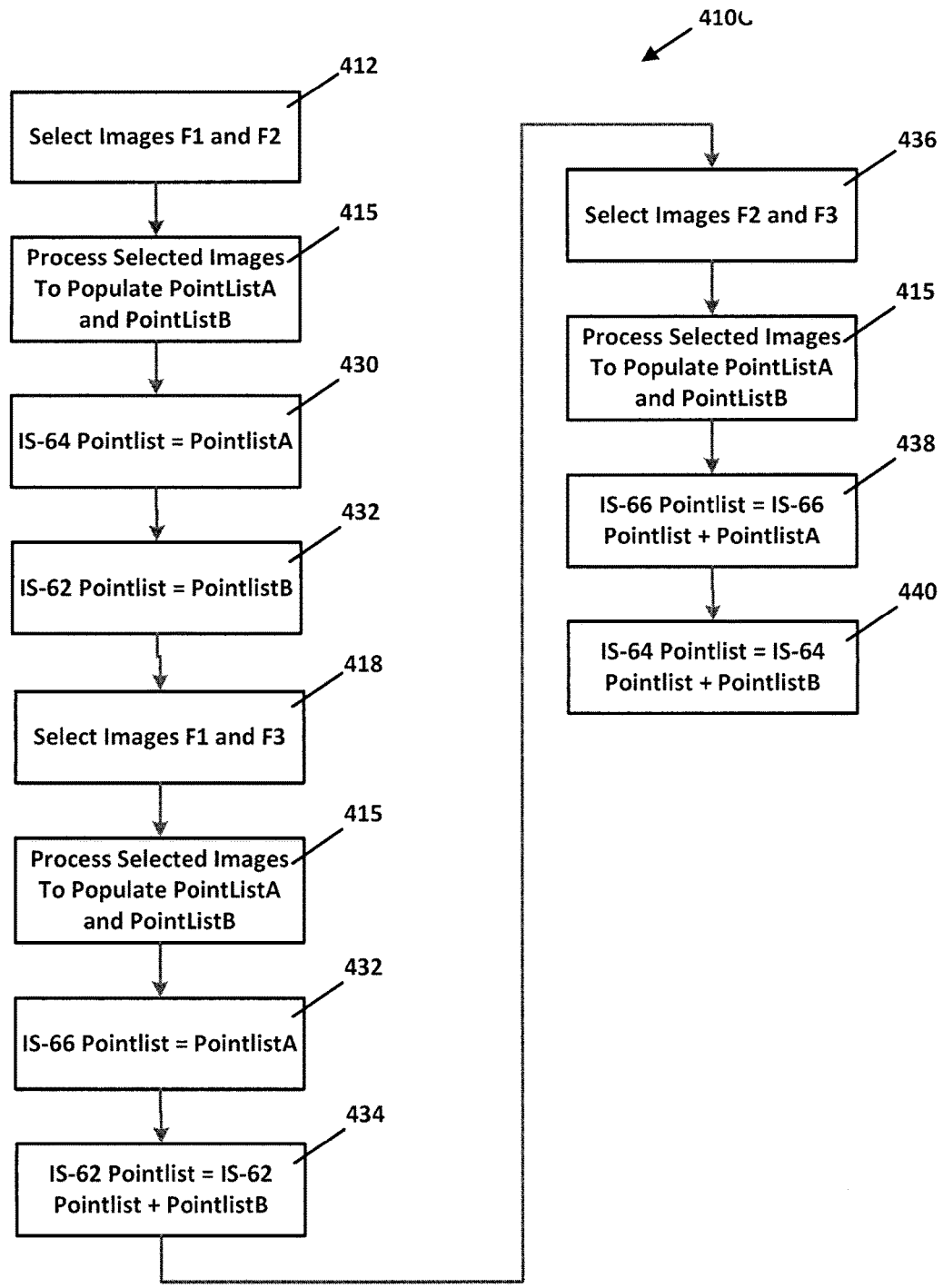
FIG. 18 is a flowchart depicting in further detail alternative steps for generating Pointlists from an alternative series of digital images captured using a device having three illumination sources, according to an embodiment.

A process 410G for generating a Pointlist for each of the illumination sources IS-62, IS-64 and IS-66 for the series of digital images depicted in Table 10, above, is shown in FIG. 18. Digital images F1 and F2 are selected (step 412), and these selected digital images are then processed to populate PointListA and PointListB (step 415). PointlistA is then considered the Pointlist for illumination source IS-64 (step 430), and PointlistB is considered the Pointlist for illumination source IS-62 (step 432). Following this, digital images F1 and F3 are then selected (step 418), and these selected digital images are then processed to populate PointlistA and PointlistB (step 415). PointlistA is then considered the Pointlist for illumination source IS-66 (step 432), and the points in PointlistB are added to the Pointlist for illumination source IS-62. Following this, digital images F2 and F3 are then selected (step 436), and these selected digital images are then processed to populate PointlistA and PointlistB (step 415). The points in PointlistA are then added to the Pointlist for illumination source IS-66 (step 438), and the points in PointlistB are then added to the Pointlist for illumination source IS-64 (step 440).

With respect to process 410G and the series of digital images in Table 10, should there be one or more points on the object in the region of interest at which the radiation beams from all of IS-62, IS-64 and IS-66 are incident, there will be no or little change to be detected in step 415. This is because at the point of such incidence, in digital image F1 it will be illuminated by IS-62 and not by IS-64, but in digital image F2 it will be illuminated by IS-64 and not by IS-62, and in both digital images F1 and F2 IS-66 will not provide any illumination. As such, the series of digital images in Table 10, and the corresponding process for determining PointlistA and PointlistB will not be able to detect points on the object in the region of interest on which all three beams of radiation from illumination sources IS-62, IS-64 and IS-66 are incident.

However, in the event that there are one or more points on the object in the region of interest at which the radiation beams from only two of illumination sources IS-62, IS-64 and IS-66 are incident, they can still detected. For example, considering digital images F1 and F2 of Table 10, any point at which both IS-62 and IS-64 are incident will not be added to the Pointlist for either IS-62 or IS-64 if step 415 is conducted only once. This is because at the point of such incidence, in digital image F1 it will be illuminated by IS-62 and not by IS-64, but in digital image F2 it will be illuminated by IS-64 and not by IS-62. However, considering digital images F2 and F3 of Table 10, the point at which the beams of radiation from both IS-62 and IS-64 are incident, provided the beam of radiation from IS-66 is not also incident on that point, can be detected due to illumination source IS-62 remaining OFF in both F2 and F3, and illumination source IS-64 being ON in digital image F2 and OFF in digital image F3. The decrease at that point in intensity being above the threshold amount will indicate the point, and as shown in FIG. 18 the point will be added to the Pointlist for illumination source IS-64.

Points on the object at which radiation beams from both IS-62 and IS-66 but not IS-64 are incident, and points on the object at which radiation beams from both IS-64 and IS-66 but not IS-62 are incident, are detected in a similar manner as set out in FIG. 18.

While embodiments have been described in which illumination sources are red lasers directing vertical laser stripes into the region of interest towards axis A, alternatives are contemplated. For example, green and/or blue vertical laser stripes could be directed into the region of interest. In this event, comparisons of intensities between green and/or blue channels of pixels would be conducted as appropriate. Furthermore, lasers producing infrared beams of radiation, for example, with a corresponding imaging system capable of detecting infrared, or other devices such as light emitting diodes (LEDs) with corresponding optics that could produce a directed narrow beam of radiation could be employed.

Furthermore, horizontal or other trajectory of stripes could be employed, with the system being calibrated to have corresponding positional and trajectory information to use triangulation for identifying points in the 3D coordinate system.

While embodiments have been described that include an imaging system with only one digital camera, imaging systems with more than one digital camera are contemplated. Additional digital cameras may be incorporated into the scanner head in a similar manner as described above, or be incorporated into a separate scanner head. Such additional digital camera(s) may be used to provide a different vantage of the region of interest, so as to capture within its field of view additional points for greater accuracy, or perhaps to reduce scan time.

While embodiments have been described that include a scanner motive system 40 for moving the scanner head 24 vertically with respect to the object support component 14, alternatives are possible. Furthermore, embodiments in which the scanner head 24 does not itself move with respect to the scanner support component 22 are contemplated in which, for example, the object support surface 16 is itself configured to be moveable upwards or downwards with respect to a fixed scanner head 24.

Furthermore, embodiments of the illumination system are contemplated that provide for adjustment by the controller 1000 of the trajectory of the laser stripe from one or each illumination source. For example, at a given rotational position, an illumination source could sweep through a range of trajectories rather than be directed only at axis A, using for example controllable motorized optical/mirror systems. A series of digital images could be captured at every beam trajectory in the range and the triangulation parameters adjusted accordingly based on the respective trajectory in order to generate 3D points for the point cloud.

In embodiments described above, the scanner support component 22 and the object support component 14 are pivotable with respect to each other. Alternative embodiments are contemplated in which components 14 and 22 are not pivotable with respect to each other, and in which components 14 and 22 may be snapped or otherwise fitted together for scanning.

In embodiments described above, the fixed path is a straight line defined by the threaded rail 42. However, in alternative embodiments, one or more curves in the fixed path may be provided. For example, the threaded rail may be curved at its upper end away from the scanner support component 22 in order to have scanner head 24 more directly face the top of the object being scanned.

In embodiments described above, the threshold intensity different of 30 bytes is used to determine if there is sufficient difference in pixel intensity to consider that interference due to background or other motion may have occurred. This was determined by trial and error based on the particular components and dimensions referred to above. However, different thresholds may be used based on various factors. For example, a selected illumination source may not have the intensity to cause a change of at least 30 bytes to be registered, and in such a situation the threshold amount may be selected to be less than 30 bytes.

Furthermore, the intensity threshold amount may be one amount at a particular Y-axis position of the scanner head 24, and at a different amount at a different Y-axis position of the scanner head 24. For example, when directing a beam of radiation into the region of interest at a point approaching the top of the object, the beam of radiation may be incident on a surface that is or is approaching being parallel to the beam of radiation. In this situation, the amount of radiation reflected back to the imaging system may be less than the amount of reflection when the beam is incident on a surface that is closer to being normal to the beam of radiation. As such, the minimum threshold amount may be automatically lowered when the scanner head is moved upwards with respect to the object support component 14.

While device 10 has been described with USB communications bus and interface structures, alternatives are possible. Furthermore, particular voltage/current levels referred to herein may be modified in any manner to provide a functional device 10, as would be understood by a person having ordinary skill in the art.

While a particular method for selecting only one object point per row at a given rotational position has been described, alternatives are contemplated. For example, an alternative method of selecting only one object point per row may include simply selecting the highest intensity point in the row.

What is claimed is:

1. A system for identifying points on the surface of an object in a region of interest, the system comprising:
   a device operable to capture digital images of an object in the region of interest, the device comprising:
      a support structure having an object support surface at the bottom of the region of interest;
      a scan head incorporating an imaging system comprising at least one digital imaging device located with respect to the support structure to have a field of view that includes a segment of the region of interest; and
      a first motive system operable to move the scan head along a fixed path between first and second vertical positions with respect to the support structure thereby to cause the at least one digital imaging device to have a field of view that includes a different segment of the region of interest;
      an illumination system switchable between a first illumination state and a second illumination state and comprising at least one illumination source, each illumination source independently operable to direct a respective beam of radiation into the region of interest;
      a second motive system operable to rotate the object support surface with respect to the support structure about an axis that is normal to the object support surface;
      and
   a computing system configured for:
      causing the illumination system to switch between the first illumination state and the second illumination state;
      causing the imaging system to capture a series of digital images of the region of interest, the series comprising at least one digital image captured during the first illumination state between digital images captured during the second illumination state;
      determining whether the digital images captured during the second illumination state are different indicating background or object motion has occurred during capture of the series of digital images; and
      in the event that the digital images captured during the second illumination state are determined to be different, re-executing the causing and determining steps; and otherwise
      processing digital images in the series of digital images to identify points on the surface of the object.

2. The system of claim 1, wherein each of the at least one illumination source is a laser, and each respective beam of radiation is a laser stripe.

3. The system of claim 2, wherein each laser is a red laser.

4. The system of claim 1, wherein the first motive system of the device comprises:
   a rail defining the fixed path; and
   a motor associated with the rail for moving the scan head along the rail.

5. The system of claim 1, wherein the second motive system of the device comprises a motor associated with the object support surface.

6. The system of claim 1, wherein processing digital images in the series of digital images to identify points on the surface of the object in the region of interest comprises:
- comparing, on a pixel-by-pixel basis, at least one of the digital images captured during the first illumination state to one of the digital images captured during the second illumination state to identify locations of pixels that are different in intensity indicating background or object motion has occurred during capture of the series of digital images; and
- storing data indicating the identified locations.

7. The system of claim 1, wherein the computing system is further configured for:
- causing the second motive system to rotate the object support surface thereby to provide the imaging system with a different vantage of the object within the region of interest.

8. The system of claim 7, wherein the computing system is further configured for:
- determining an amount of rotation the second motive system is caused to rotate the object support surface based on a distance, determined during the processing, between the imaging system and the object.

9. The system of claim 7, wherein the computing system is further configured for:
- determining whether to move the scan head to a different position along the fixed path based on location of identified points on the surface of the object; and
- in the event that the scan head is to be moved, causing the first motive system to move the scan head to the different position.

* * * * *